US012613953B2

(12) United States Patent
Arian et al.

(10) Patent No.: US 12,613,953 B2
(45) Date of Patent: Apr. 28, 2026

(54) DYNAMIC ASSIGNMENT OF COLLECTOR MODULES TO MULTI-TENANTED ISOLATED EXECUTION ENVIRONMENTS

(71) Applicant: Cisco Technology, Inc., San Jose, CA (US)

(72) Inventors: Mehrdad Arian, Vancouver (CA); Omprakaash Thoppai, San Jose, CA (US); Muzhi Ou, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/618,620

(22) Filed: Mar. 27, 2024

(65) Prior Publication Data

US 2025/0307379 A1     Oct. 2, 2025

(51) Int. Cl.
*G06F 21/53*          (2013.01)
(52) U.S. Cl.
CPC ........ *G06F 21/53* (2013.01); *G06F 2221/034* (2013.01)
(58) Field of Classification Search
CPC ........................... G06F 21/53; G06F 2221/034
See application file for complete search history.

(56) References Cited

U.S. PATENT DOCUMENTS

| | | | |
|---|---|---|---|
| 10,262,271 B1 | 4/2019 | Doddi et al. | |
| 10,613,897 B1 * | 4/2020 | Wang ................... | G06F 9/4843 |
| 10,929,415 B1 | 2/2021 | Shcherbakov et al. | |
| 11,513,846 B1 | 11/2022 | Fletcher et al. | |
| 2009/0106780 A1 * | 4/2009 | Nord ......................... | G06F 8/60 |
| | | | 719/329 |
| 2020/0364223 A1 | 11/2020 | Pal et al. | |
| 2022/0014451 A1 | 1/2022 | Naik et al. | |
| 2022/0103349 A1 * | 3/2022 | Tsirkin ................... | G06F 21/53 |
| 2022/0247819 A1 * | 8/2022 | Tornow ................... | H04L 67/34 |
| 2022/0413943 A1 | 12/2022 | Poornachandran et al. | |

(Continued)

OTHER PUBLICATIONS

International Search Report and Written Opinion Mailed Feb. 4, 2025 in International Patent Application No. PCT/US2024/039050. 12 pages.

(Continued)

*Primary Examiner* — Beemnet W Dada

(74) *Attorney, Agent, or Firm* — Shook, Hardy & Bacon L.L.P.

(57)          ABSTRACT

A host computing device can include a plurality of isolated execution environments and a communication buffer. Each of the isolated execution environments can include an application interface, a plurality of collector modules, a coordinator module, and a scheduler module. The application interface can determine configurations for a plurality of connectors configured to collect data from respective data sources. The plurality of collector modules can include collector modules that correspond to one or more connectors and collect data from data sources of one or more tenants. The coordinator module can monitor execution of the plurality of collector modules and the scheduler module can assign collector modules of a connector between the plurality of isolated execution environments. The communication buffer can include configuration data, connector-isolated execution environment assignments, and a status of collector modules.

20 Claims, 14 Drawing Sheets

(56)                 References Cited

U.S. PATENT DOCUMENTS

| | | | |
|---|---|---|---|
| 2023/0106455 A1* | 4/2023 | Bursell | ................. H04L 9/0897 |
| | | | 726/22 |
| 2023/0188516 A1* | 6/2023 | Danilov | ............... G06F 9/5072 |
| | | | 726/7 |

OTHER PUBLICATIONS

Mickael et al. "Kafka connect: Build and run data pipelines" Published Oct. 3, 2023 and retrieved Dec. 16, 2024 from the Internet at <https://www.redhat.com/rhdc/managed-files/cl-oreilly-kafka-connect-pipelines-analyst-material-529052-202310-en.pdf>. pp. 1-403.

* cited by examiner

FIG. 5

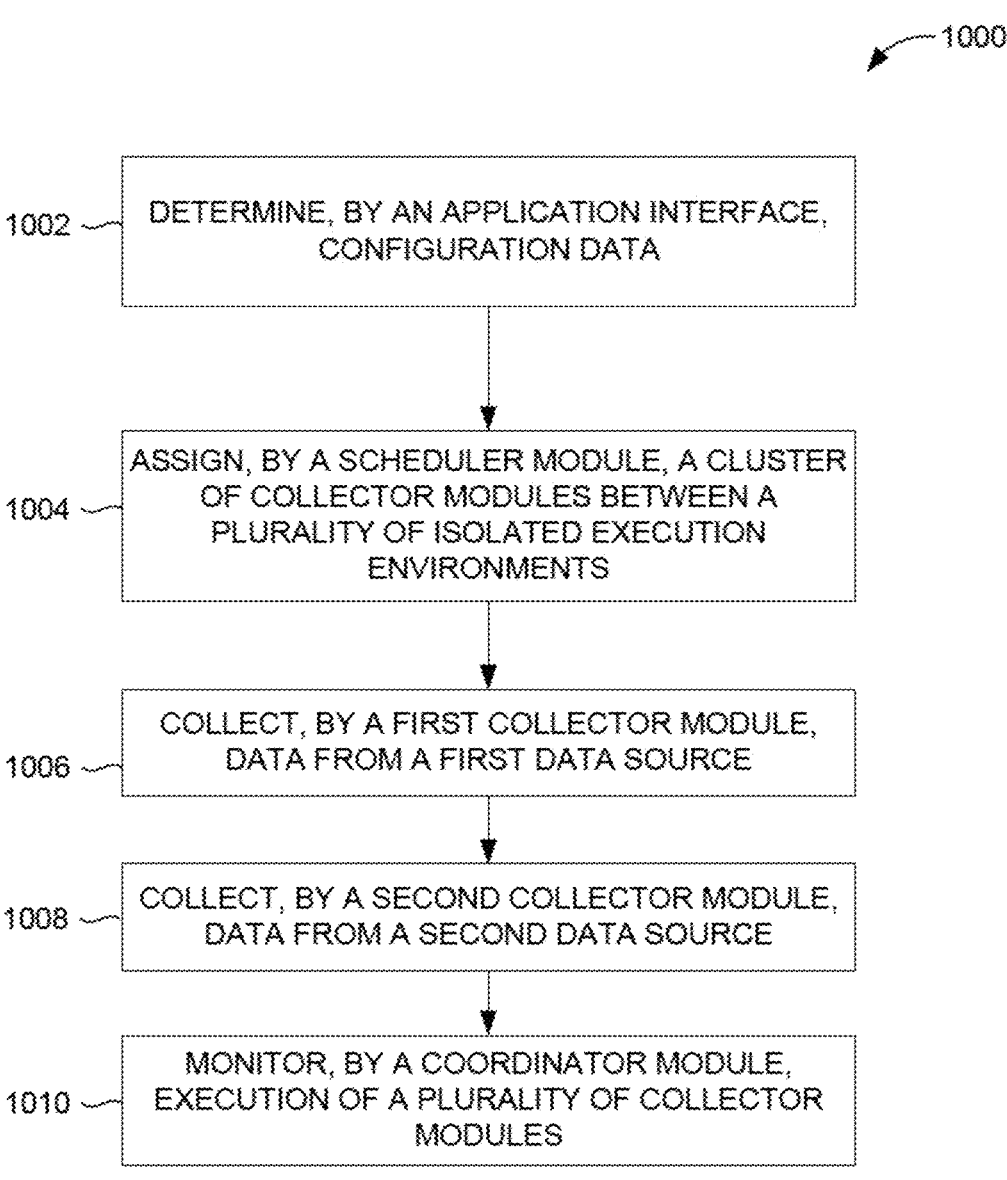

1000

1002 — DETERMINE, BY AN APPLICATION INTERFACE, CONFIGURATION DATA

1004 — ASSIGN, BY A SCHEDULER MODULE, A CLUSTER OF COLLECTOR MODULES BETWEEN A PLURALITY OF ISOLATED EXECUTION ENVIRONMENTS

1006 — COLLECT, BY A FIRST COLLECTOR MODULE, DATA FROM A FIRST DATA SOURCE

1008 — COLLECT, BY A SECOND COLLECTOR MODULE, DATA FROM A SECOND DATA SOURCE

1010 — MONITOR, BY A COORDINATOR MODULE, EXECUTION OF A PLURALITY OF COLLECTOR MODULES

1102 — RETRIEVE CONFIGURATION DATA

1104 — DETERMINE A RANGE OF COLLECTOR MODULES AND A RANGE OF CONNECTOR-SPECIFIC COLLECTOR MODULES

1106 — ASSIGN A GROUP OF COLLECTOR MODULES BASED ON THE DETERMINED RANGES

1202 — RECEIVE AN INSTRUCTION TO COLLECT DATA FROM A DATA SOURCE

1204 — DETERMINE A TYPE OF THE DATA SOURCE

1206 — ASSIGN A PLURALITY OF ISOLATED EXECUTION ENVIRONMENTS TO GENERATE A CLUSTER OF COLLECTOR MODULES TO RETRIEVE THE DATA

1208 — ASSIGN A COLLECTOR MODULE OF THE CLUSTER AS A CLUSTER LEADER

1210 — RETRIEVE THE DATA

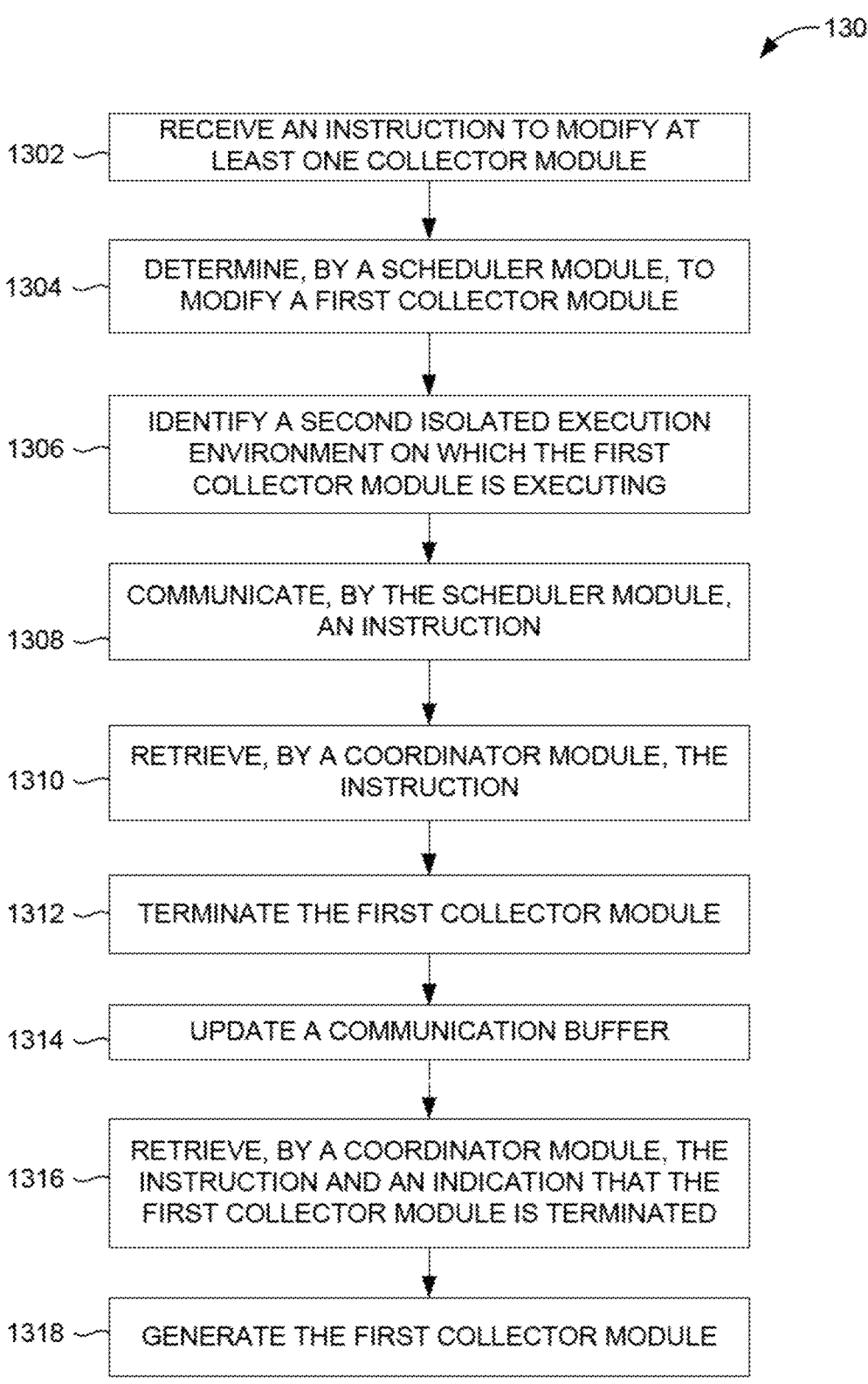

1300

1302 — RECEIVE AN INSTRUCTION TO MODIFY AT LEAST ONE COLLECTOR MODULE

1304 — DETERMINE, BY A SCHEDULER MODULE, TO MODIFY A FIRST COLLECTOR MODULE

1306 — IDENTIFY A SECOND ISOLATED EXECUTION ENVIRONMENT ON WHICH THE FIRST COLLECTOR MODULE IS EXECUTING

1308 — COMMUNICATE, BY THE SCHEDULER MODULE, AN INSTRUCTION

1310 — RETRIEVE, BY A COORDINATOR MODULE, THE INSTRUCTION

1312 — TERMINATE THE FIRST COLLECTOR MODULE

1314 — UPDATE A COMMUNICATION BUFFER

1316 — RETRIEVE, BY A COORDINATOR MODULE, THE INSTRUCTION AND AN INDICATION THAT THE FIRST COLLECTOR MODULE IS TERMINATED

1318 — GENERATE THE FIRST COLLECTOR MODULE

FIG. 13

DYNAMIC ASSIGNMENT OF COLLECTOR MODULES TO MULTI-TENANTED ISOLATED EXECUTION ENVIRONMENTS

RELATED APPLICATIONS

This application is being filed concurrently with U.S. Non-Provisional patent application Ser. No. 18/618,692, filed Mar. 27, 2024, and entitled "SCHEDULING COLLECTOR MODULES ACROSS ISOLATED EXECUTION ENVIRONMENTS USING A SCHEDULER MODULE," U.S. Non-Provisional patent application Ser. No. 18/618,772, filed Mar. 27, 2024, and entitled "COLLECTOR MODULE COORDINATION FOR INGESTION OF DATA FROM A DATA SOURCE," and U.S. Non-Provisional patent application Ser. No. 18/618,629, filed Mar. 27, 2024, and entitled "TRANSITION OF COLLECTOR MODULES BETWEEN ISOLATED EXECUTION ENVIRONMENTS," which are each hereby incorporated by reference in its entirety herein.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements and in which:

FIG. 5 is a block diagram of an example host computing device to obtain data from a data source, in accordance with example embodiments;

FIG. 10 is a flow diagram illustrative of an example of a routine, implemented by a host computing device, for use of multi-tenanted isolated execution environments;

FIG. 13 is a flow diagram illustrative of an example of a routine, implemented by a host computing device, for transitioning a collector module between isolated execution environments.

DETAILED DESCRIPTION

Figure 1:
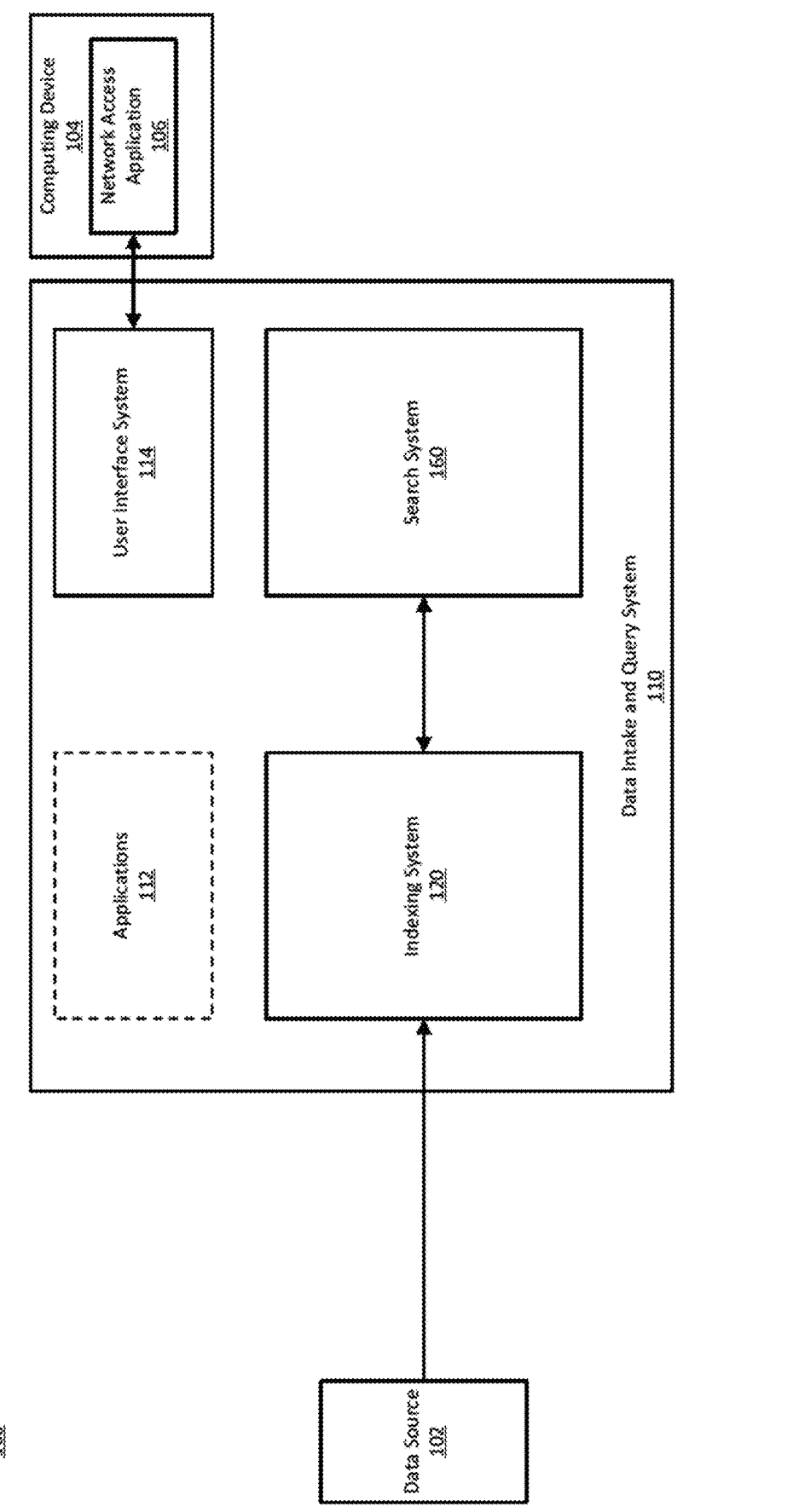
FIG. 1 is a block diagram of an example computing environment, in accordance with example embodiments.

Embodiments are described herein according to the following outline:

1.0. GENERAL OVERVIEW
2.0. ISOLATED EXECUTION ENVIRONMENTS AS DATA COLLECTION NODES OVERVIEW
    2.1. ARCHITECTURE FOR INGESTING DATA
    2.2. INGESTING DATA USING ISOLATED EXECUTION ENVIRONMENTS
    2.3. DYNAMIC ASSIGNMENT OF COLLECTOR MODULES TO ISOLATED EXECUTION ENVIRONMENTS
    2.4. SCHEDULING AND UTILIZING COLLECTOR MODULES
    2.5. COORDINATING COLLECTOR MODULES
    2.6. TRANSITIONING COLLECTOR MODULES
3.0. HARDWARE EMBODIMENT
4.0. EXAMPLE EMBODIMENTS
5.0. TERMINOLOGY

In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

1.0. General Overview

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include applications 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces and/or stores machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail herein, the indexing system 120 obtains machine date from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index may identify portions of the events (e.g., keywords). The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing system 120. As discussed in greater detail herein, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as keywords, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 104. In such examples, the network access application 106 can access the user interface system 114 without going over a network.

The data intake and query system 110 can optionally include applications 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
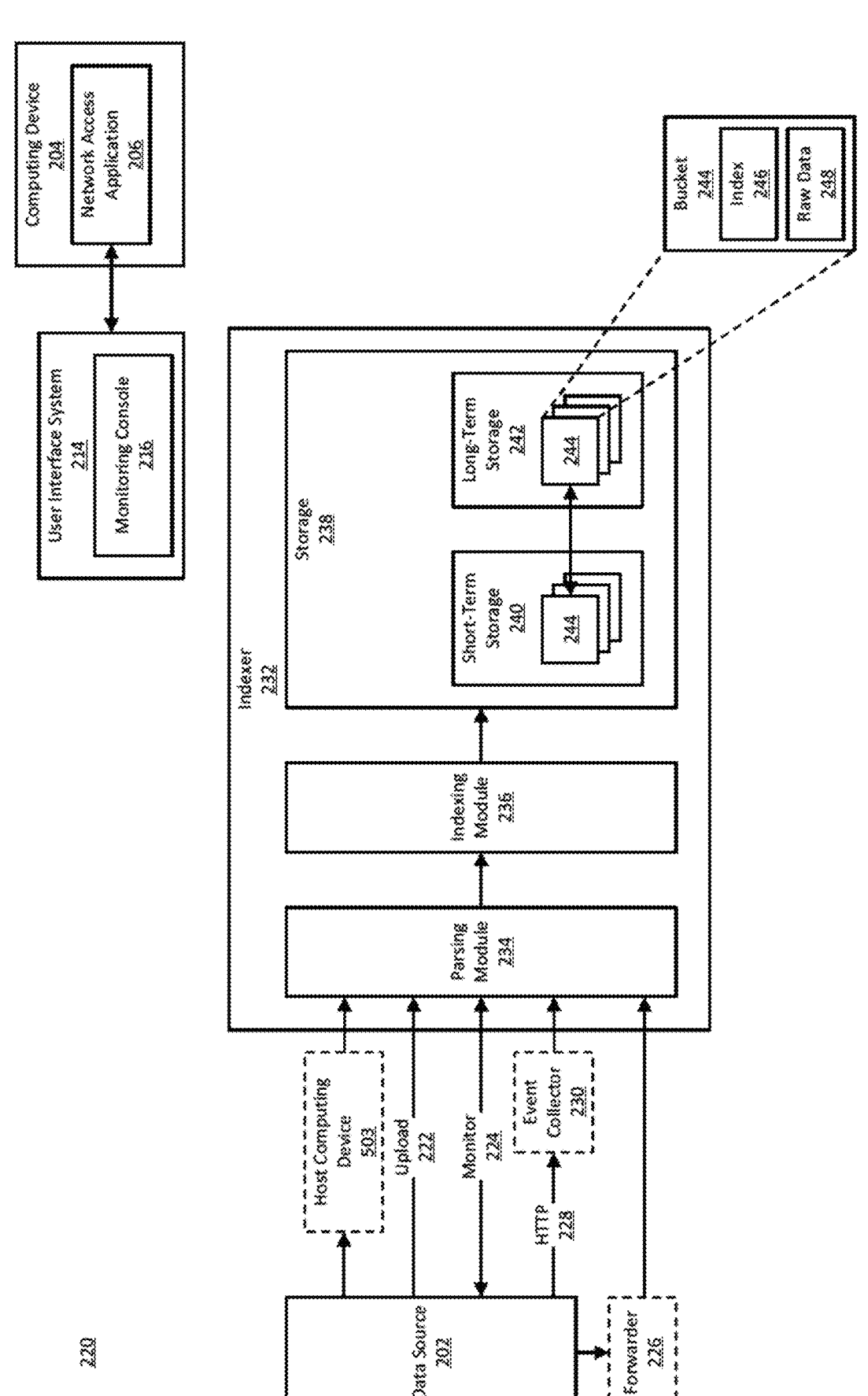
FIG. 2 is a block diagram of an example indexing system, in accordance with example embodiments.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 246 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 202; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further herein.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. In some cases, these methods may include using a host computing device 503 on which a plurality of isolated execution environments are instantiated as discussed herein. The host computing device 503 may route data to the indexer 232, to the event collector 230, etc. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or maybe on the computing device where the indexer 232 is executing. Once uploading is initiated, the indexer 232 processes the file, as discussed further herein. Uploading is a manual process and occurs when instigated by a user. For automated data ingestion, the other ingestion methods are used.

The monitor 224 method enables the indexing system to monitor the data source 202 and continuously or periodically obtain data produced by the data source 202 for ingestion by the indexer 232. For example, using the monitoring console 216, a user can specify a file or directory for monitoring. In this example, the indexing system can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further herein) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executing on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and keep separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further herein) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request from the data source 202, and/or to indicate to the data source 202 that events in the request have been indexed.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes generating an index (e.g., identifying keywords associated with the generated events) based on the generated events. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated in FIG. 2 to facilitate discussion, with the understanding that implementations with other components are possible to achieve the same functionality.

The parsing module 234 determines information about incoming event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field in the event data or using machine learning techniques applied to the event data.

Other information that the parsing module 234 can determine includes timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields (key-value pairs) for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing module 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further herein, the search system can use the lexicon, which is stored in an index 246 (e.g., an index file), to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

The storage 238 may be a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 232 has access to over a network. The indexer 232 can manage more than one index and can manage indexes of different types. For example, the indexer 232 can manage event indexes, which impose minimal structure on stored data and can accommodate any type of data. As another example, the indexer 232 can manage metrics indexes, which use a highly structured format to handle the higher volume and lower latency demands associated with metrics data.

The indexing module 236 organizes files in the storage 238 in directories referred to as buckets. The files in a bucket 244 can include raw data files, indexes, and possibly also other metadata files. As used herein, "raw data" means data as when the data was produced by the data source 202, without alteration to the format or content. As noted previously, the parsing module 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index 246, which may also be referred to herein as a "time-series index" or tsidx file, contains metadata that the indexer 232 can use to search a corresponding raw data file 248. As noted above, the metadata in the index 246 includes a lexicon of the event data, which associates each unique keyword in the event data with a reference to the location of event data within the raw data file 248. The keyword data in the index 246 may also be referred to as an inverted index. In various implementations, the data intake and query system can use indexes for other purposes, such as to store data summarizations that can be used to accelerate searches.

A bucket 244 includes event data for a particular range of time. The indexing module 236 arranges buckets in the storage 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moves from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the indexer 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
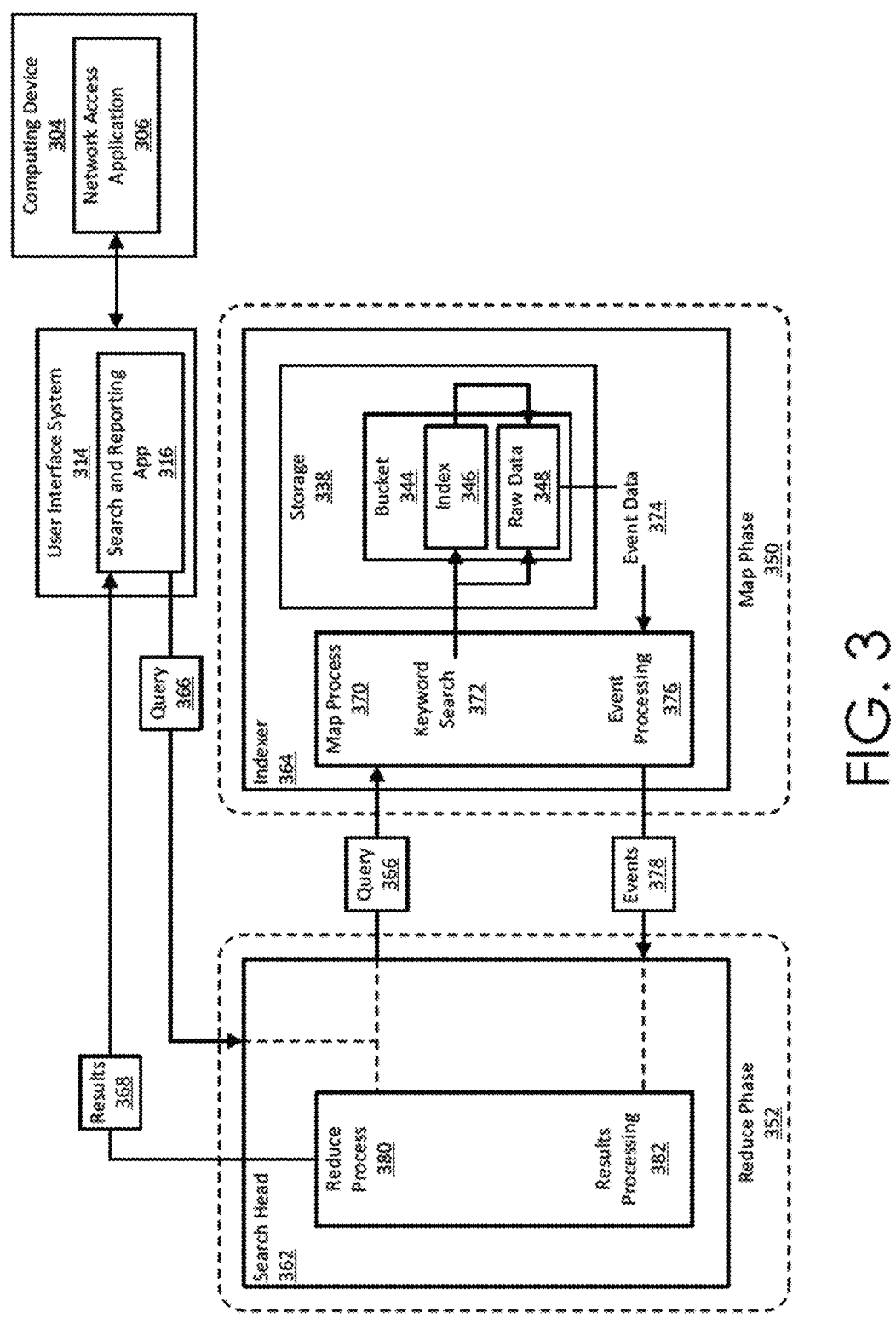
FIG. 3 is a block diagram of an example search system, in accordance with example embodiments.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to an indexer 364 (e.g., a search peer, a search node, etc.). Using a map process 370, the indexer 364 searches the appropriate storage 338 for events identified by the query 366 and sends events 378 so identified back to the search head 362. Using a reduce process 382, the search head 362 processes the events 378 and produces results 368 to respond to the query 366. The results 368 can provide useful insights about the data stored in the storage 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 maybe referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands or search terms that the indexer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("I" or "pipe") symbol.

In addition to one or more search commands, the query 366 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more indexers. In the map phase 350, the indexers locate event data that matches the search terms in the search query 366 and sorts the event data into field-value pairs. When the map phase 350 is complete, the indexers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more indexers, such as the indexer 364 illustrated in FIG. 3. "Search peer" is an alternate name for "indexer" and a search peer may be largely similar to the indexer described previously. The indexer 364 may be referred to as a "peer node" when the indexer 364 is part of an indexer cluster. The indexer 364, which may also be referred to as a search execution component, can be implemented using program code that can be executed on a computing device. In some implementations, one set of program code implements both the search head 362 and the indexer 364 such that the search head 362 and the indexer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular indexer 364. For example, the search system 360 may be configured to include multiple indexers that each have duplicative copies of at least some of the event data and are implanted using different hardware resources. In this example, the sending the search query 366 to more than one indexer allows the search system 360 to distribute the search workload across different hardware resources. As another example, search system 360 may include different indexers for different purposes (e.g., one has an index storing a first type of data or from a first data source while a second has an index storing a second type of data or from a second data source). In this example, the search query 366 may specify which indexes to search, and the search head 362 will send the query 366 to the indexers that have those indexes.

To identify events 378 to send back to the search head 362, the indexer 364 performs a map process 370 to obtain event data 374 from the storage 338 that is maintained by the indexer 364. During a first phase of the map process 370, the indexer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the indexer 364 performs a keyword search 372 using search terms specified in the search query 366. The search terms can be one or more of keywords, phrases, fields, Boolean expressions, and/or comparison expressions that in combination describe events being searched for. When segmentation is enabled at index time, the indexer 364 performs the keyword search 372 on the bucket's index 346. As noted previously, the index 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index 346 that matches a search term in the query 366, the indexer 364 can use the location references to extract from the raw data 348 file the event data 374 for each event that include the searchable term.

In cases where segmentation was disabled at index time, the indexer 364 performs the keyword search 372 directly on the raw data 348 file. To search the raw data 348, the indexer 364 may identify searchable segments in events in a similar manner as when the data was indexed. Thus, depending on how the indexer 364 is configured, the indexer 364 may look at event fields and/or parts of event fields to determine whether an event matches the query 366. Any matching events can be added to the event data 374 read from the raw data 348 file. The indexer 364 can further be configured to enable segmentation at search time, so that searching of the storage 338 causes the indexer 364 to build a lexicon in the index 346.

The event data 374 obtained from the raw data 348 file includes the full text of each event found by the keyword search 372. During a third phase of the map process 370, the indexer 364 performs event processing 376 on the event data 374, with the steps performed being determined by the configuration of the indexer 364 and/or commands in the search query 366. For example, the indexer 364 can be configured to perform field discovery and field extraction. Field discovery is a process by which the indexer 364 identifies and extracts key-value pairs from the events in the event data 374. The indexer 364 can, for example, be configured to automatically extract the first 100 fields (or another number of fields) in the event data 374 that can be identified as key-value pairs. As another example, the indexer 364 can extract any fields explicitly mentioned in the search query 366. The indexer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The indexer 364 sends processed events 378 to the search head 362, which performs a reduce process 380. The reduce process 380 potentially receives events from multiple indexers and performs various results processing 382 steps on the received events. The results processing 382 steps can include, for example, aggregating the events received from different indexers into a single set of events, deduplicating and aggregating fields discovered by different indexers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Chloropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 368. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 4:
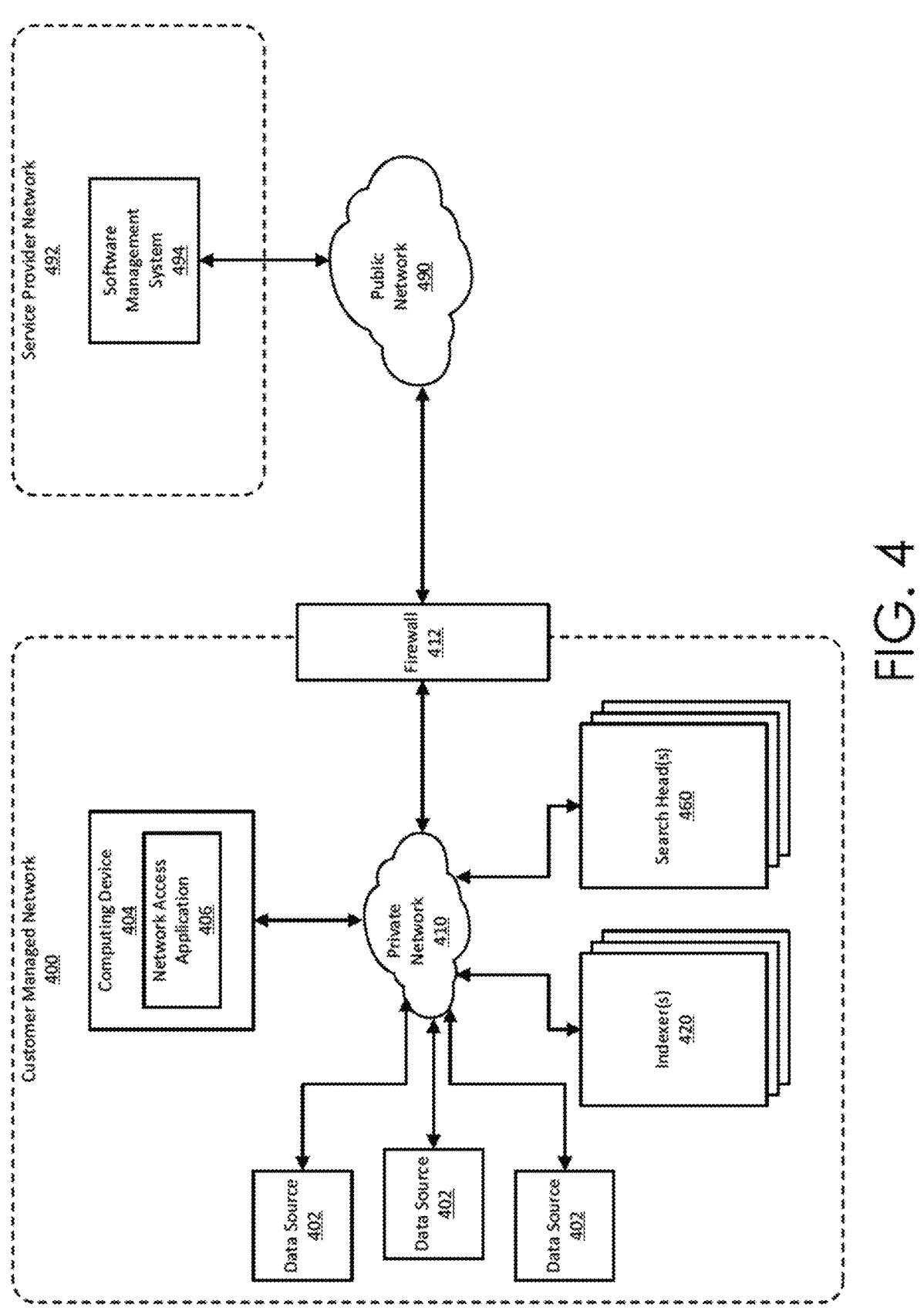
FIG. 4 is a block diagram of an example self-managed network, in accordance with example embodiments.

FIG. 4 illustrates an example of a self-managed network 400 that includes a data intake and query system. "Self-managed" in this instance means that the entity that is operating the self-managed network 400 configures, administers, maintains, and/or operates the data intake and query system using its own compute resources and people. Further, the self-managed network 400 of this example is part of the entity's on-premise network and includes a set of compute, memory, and networking resources that are located, for example, within the confines of an entity's data center. These resources can include software and hardware resources. The entity can, for example, be a company or enterprise, a school, government entity, or other entity. Since the self-managed network 400 is located within the customer's on-prem environment, such as in the entity's data center, the operation and management of the self-managed network 400, including of the resources in the self-managed network 400, is under the control of the entity. For example, administrative personnel of the entity have complete access to and control over the configuration, management, and security of the self-managed network 400 and its resources.

The self-managed network 400 can execute one or more instances of the data intake and query system. An instance of the data intake and query system may be executed by one or more computing devices that are part of the self-managed network 400. A data intake and query system instance can include an indexing system and a search system, where the indexing system includes one or more indexers 420 and the search system includes one or more search heads 460.

As depicted in FIG. 4, the self-managed network 400 can include one or more data sources 402. Data received from these data sources may be processed by an instance of the data intake and query system within self-managed network 400. The data sources 402 and the data intake and query system instance can be communicatively coupled to each other via a private network 410.

Users associated with the entity can interact with and avail themselves of the functions performed by a data intake and query system instance using computing devices. As depicted in FIG. 4, a computing device 404 can execute a network access application 406 (e.g., a web browser), that can communicate with the data intake and query system instance and with data sources 402 via the private network 410. Using the computing device 404, a user can perform various operations with respect to the data intake and query system, such as management and administration of the data intake and query system, generation of knowledge objects, and other functions. Results generated from processing performed by the data intake and query system instance may be communicated to the computing device 404 and output to the user via an output system (e.g., a screen) of the computing device 404.

The self-managed network 400 can also be connected to other networks that are outside the entity's on-premise environment/network, such as networks outside the entity's data center. Connectivity to these other external networks is controlled and regulated through one or more layers of security provided by the self-managed network 400. One or more of these security layers can be implemented using firewalls 412. The firewalls 412 form a layer of security around the self-managed network 400 and regulate the transmission of traffic from the self-managed network 400 to the other networks and from these other networks to the self-managed network 400.

Networks external to the self-managed network can include various types of networks including public networks 490, other private networks, and/or cloud networks provided by one or more cloud service providers. An example of a public network 490 is the Internet. In the example depicted in FIG. 4, the self-managed network 400 is connected to a service provider network 492 provided by a cloud service provider via the public network 490.

In some implementations, resources provided by a cloud service provider may be used to facilitate the configuration and management of resources within the self-managed network 400. For example, configuration and management of a data intake and query system instance in the self-managed network 400 may be facilitated by a software management system 494 operating in the service provider network 492. There are various ways in which the software management system 494 can facilitate the configuration and management of a data intake and query system instance within the self-managed network 400. As one example, the software management system 494 may facilitate the download of software including software updates for the data intake and query system. In this example, the software management system 494 may store information indicative of the versions of the various data intake and query system instances present in the self-managed network 400. When a software patch or upgrade is available for an instance, the software management system 494 may inform the self-managed network 400 of the patch or upgrade. This can be done via messages communicated from the software management system 494 to the self-managed network 400.

The software management system 494 may also provide simplified ways for the patches and/or upgrades to be downloaded and applied to the self-managed network 400. For example, a message communicated from the software management system 494 to the self-managed network 400 regarding a software upgrade may include a Uniform Resource Identifier (URI) that can be used by a system administrator of the self-managed network 400 to download the upgrade to the self-managed network 400. In this manner, management resources provided by a cloud service provider using the service provider network 492 and which are located outside the self-managed network 400 can be used to facilitate the configuration and management of one or more resources within the entity's on-prem environment. In some implementations, the download of the upgrades and patches may be automated, whereby the software management system 494 is authorized to, upon determining that a patch is applicable to a data intake and query system instance inside the self-managed network 400, automatically communicate the upgrade or patch to self-managed network 400 and cause it to be installed within self-managed network 400.

2.0. Isolated Execution Environments as Data Collection Nodes Overview

A host computing device (which may also be referred to herein as a host device, a computing device, etc.) may facilitate ingest of data from a data source. For example, the host computing device can ingest data and provide the ingested data to a data intake and query system, an event collector, etc.

The host computing device may include one or more workers instantiated as isolated execution environments. The one or more isolated execution environments may be instantiated on the host computing device and may share compute resources of the host computing device. The one or more isolated execution environments may include one or more collector modules (which may be referred to herein as collector processes, collectors, collection processes, etc.) to ingest the data. For example, the one or more collector modules may be and/or may include OpenTelemetry Collectors.

Such a system may prove unsatisfactory where the amount of data varies. For example, such a system may prove unsatisfactory where the amount of data varies (e.g., is scaled) such that the number of collector modules is inadequate (e.g., are not directed to the varied amount of data) and/or a load on an isolated execution environment satisfies (e.g., matches, exceeds, etc.) a threshold. Such a system may support ingesting a particular amount of data (e.g., a particular range of amounts of data) and, as the amount of data varies, the system may not be able to efficiently support the varied amount of data (e.g., without introducing delays, performance issues, etc.). Instead, such a system may ingest data in a fixed manner. For example, such a system may ingest data using particular isolated execution environments and/or collector modules without adjusting a number of the particular isolated execution environments and/or collector modules. Such a system may not be able to dynamically allocate collector modules between isolated execution environments and/or dynamically transition collector modules between isolated execution environments. For example, such a system may ingest data using a fixed assignment of collector modules to particular isolated execution environments such that the system cannot transition collector modules between isolated execution environments, vary a number of collector modules assigned to a particular isolated execution environment, etc. This can lead to a loss in efficiency which may be undesirable as it can lead to longer data ingestion times, unbalanced workloads, and/or an inability to ingest particular data.

Such a system may prove unsatisfactory where the type of data sources varies. For example, while the system may support ingesting data from a first type of data source (e.g., a data source that natively supports parallel data reads), the system may not support ingesting data from a second type of data source (e.g., a data source that does not natively support parallel data reads). As such a system may not be able to support ingesting data from particular types of data sources, the functionality of a such a system may be limited.

Such a system may be limited to ingesting data from a single type of data source. In some cases, such a system may be limited to ingesting data from a single type of data source associated with a single tenant. For example, such a system may be limited to ingesting data, using a collector module, from a particular type of data source associated with a particular tenant.

Such an ingest of data may result in efficiency issues and/or performance issues. In some cases, such an ingest of data may result in an inadequate user experience as the ingestion of first data may be semantically different from the ingestion of second data (e.g., may utilize different host computing devices), may result in an error output, etc. For example, such an ingest of data from a data source that does not natively support parallel data reads by a host computing device that does not include a particular collector module to facilitate reads of the data by other collector modules may result in an inadequate user experience.

Thus by ingesting data in such a manner (e.g., using a host computing device), the system may experience a longer data ingestion time and/or an inability to ingest particular data. This may cause an inadequate performance.

To address these issues, embodiments of the present disclosure relate to a system that includes a host computing device including a plurality of workers instantiated as isolated execution environments. All or a portion of the plurality of isolated execution environments may include a coordinator module, a scheduler module, a collector module, an application interface, etc. The host computing device may include a communication buffer that is communicatively coupled to and/or accessible by all or a portion of the plurality of isolated execution environments. The host computing device may facilitate ingesting of data from one or more data sources using collector modules of the plurality of isolated execution environments.

The host computing device may receive instructions, via an application interface of an isolated execution environment of the plurality of isolated execution environments, from a computing device (e.g., a client device). The instructions may include instructions to ingest (e.g., obtain, collect, etc.) particular data (e.g., one or more blocks of data) from one or more data sources.

Based on the instructions, the application interface may provide (e.g., store and/or update previously stored) configuration data. The configuration data may indicate a connector (e.g., a cluster of collector modules to obtain data from a same data source) and a number of collector modules for ingesting the data. The application interface may store the configuration data in the communication buffer.

The host computing device, using the plurality of isolated execution environments, can assign an isolated execution environment of the plurality of isolated execution environments to be and/or include an active scheduler module. For example, the plurality of isolated execution environments can self-assign an active scheduler module.

Based on the configuration data and the assignment of the active scheduler module, the active scheduler module can identify the one or more connectors and the one or more collector modules and assign (e.g., allocate) collector modules to the isolated execution environments. For example, the active scheduler module can dynamically assign collector modules for generation, termination, etc. by a particular isolated execution environment. Based on the assignment of the collector modules to the isolated execution environments, the active scheduler module can generate and/or update assignment data (e.g., connector-isolated execution environment assignments) and store the assignment data in the communication buffer.

In some cases, the assignment data may indicate an isolated execution environment is assigned collector modules associated with different connectors (e.g., a first collector module associated with a first connector and a second collector module associated with a second connector). In some cases, the assignment data may indicate an isolated execution environment is assigned multiple collector modules associated with the same connector (e.g., a first collector module and a second collector module associated with the same connector).

All or a portion of the coordinator modules of the plurality of isolated execution environments can obtain the assignment data from the communication buffer. Based on the assignment data, all or a portion of the coordinator modules can determine collector modules assigned to the associated isolated execution environment. Based on the determined collector modules, all or a portion of the coordinator modules can terminate, generate, implement, etc. collector modules.

In some cases, all or a portion of the coordinator modules can monitor termination, generation, implementation, etc. of the determined collector modules. For example, a coordinator module of an isolated execution environment can monitor execution of collector modules by the isolated execution environment. In some cases, all or a portion of the coordinator modules can generate and/or update status data (e.g., a status of collector modules) and store the status data in the communication buffer. For example, a coordinator module can monitor termination, generation, implementation, etc. of the determined collector modules and, based on monitoring the termination, generation, implementation, etc. of the determined collector modules, generate status data indicating whether a collector module is terminated, generated, implemented, etc. by a particular isolated execution environment.

In some cases, the host computing device can transition collector modules between isolated execution environments using the coordinator modules. The host computing device can transition collector modules between isolated execution environments in response to spinning up or spinning down an isolated execution environment, in response to a modification (e.g., an increase or decrease) in the number of collector modules (e.g., for a particular connector, for a particular isolated execution environment, for the host computing device, etc.), etc. to balance a workload among the isolated execution environments. For example, in response to user instructions to generate and/or terminate collector module, in response to generation and/or termination of an isolated execution environment, etc., the host computing device can transition collector modules between isolated execution environments to rebalance the isolated execution environments.

The host computing device can manage transition of the collector modules by confirming that a collector module to be transitioned from a first isolated execution environment to a second isolated execution environment is terminated by the first isolated execution environment prior to instructing the second isolated execution environment to generate the collector module. For example, based on the assignment data indicating that a first isolated execution environment is to terminate a collector module, a coordinator module of the first isolated execution environment can terminate the collector module and update the status data to indicate the collector module is terminated by the first isolated execution environment. Based on the assignment data indicating that a second isolated execution environment is to generate the collector module and the status data indicating the collector module is terminated, a coordinator module of the second isolated execution environment can generate the collector module and update the status data to indicate the collector module is generated by the second isolated execution environment.

Based on the assignment data, the host computing device can facilitate the ingestion of data from one or more data sources using the assigned collector modules. For example, a first cluster of collector modules corresponding to a first connector can obtain data from a first data source, a second cluster of collector modules corresponding to a second connector can obtain data from a second data source, etc.

In some cases, the collector modules (or the scheduler module) can determine a type of data source of the one or more data sources and may adjust how the collector modules ingest data from the one or more data sources based on the type of data source. For example, the collector modules can determine whether the one or more data sources are a type of data source that supports parallel reads or a type of data source that does not support parallel reads. If the collector modules determines that the one or more data sources are a type of data source that do not support parallel reads, the collector modules can identify a collector module of the collector modules elected as a cluster leader (e.g., as elected by the collector modules based on a leader election process implemented by the collector modules) to obtain a data identifier identifying data from the one or more data sources for ingestion and store the data identifier in a data store such that the collector modules can obtain the data identifier from the data store and ingest the data based on the data identifier. If the collector modules determines that the one or more data sources are a type of data source that support parallel reads, the host computing device can ingest the data using the collector modules without identifying a cluster leader.

As such, the described host computing device enables the efficient ingestion of data as compared to other approaches. For example, the host computing device can ingest data from one or more data sources in an efficient manner based on an assignment of collector modules to isolated execution environments. As separate systems may be utilized to ingest data associated with different tenants and/or data from data sources having different types, the assignment of collector modules to isolated execution environments may not impact (e.g., increase) a time period for ingestion of data.

2.1. Architecture for Ingesting Data

As described herein, the host computing device can ingest data utilizing a plurality of isolated execution environments. The host computing device can utilize application interfaces, scheduler modules, coordinator modules, and/or collector modules of the plurality of isolated execution environments and a communication buffer communicatively coupled to the plurality of isolated execution environments to ingest the data.

The techniques described herein can enable the host computing device to assign (e.g., scale and/or balance) the isolated execution environments based on a status of collector modules, connector-isolated execution environment assignments, and/or configuration data as stored via the communication buffer. For example, the host computing device can spin up and/or spin down isolated execution environments based on a workload. The host computing device, via the isolated execution environments, can assign (e.g., scale and/or balance) collector modules between the isolated execution environments. For example, a scheduler module of the host computing device can assign a first isolated execution environment to generate a first collector module and a second collector module and a second isolated execution environment to terminate the first collector module. The host computing device can enable the ingestion of data by the isolated execution environments utilizing the assigned isolated execution environments and the assigned collector modules. These techniques solve challenges of other systems in that these systems may enable the ingestion of data in a more efficient manner using the isolated execution environments and the collector modules as dynamically scaled and/or balanced. Moreover, these techniques can reduce the workload at a single isolated execution environment and/or a single collector module via the dynamic assignment of a collector module to ingest particular data.

In some cases, systems may be unable to dynamically assign isolated execution environments and/or collector modules (e.g., based on data identified for ingestion, based on a type of data source, etc.). As the amount of data increases and the number of diverse data sources (e.g., with different capabilities, different optimizations, etc.) increases, it may be beneficial for the system to dynamically (re)assign isolated execution environments and/or reassign collector modules to different isolated execution environments, etc., especially where the data for ingestion may be associated with multiple tenants (e.g., tenants requesting data isolation and/or siloing).

Figure 5:
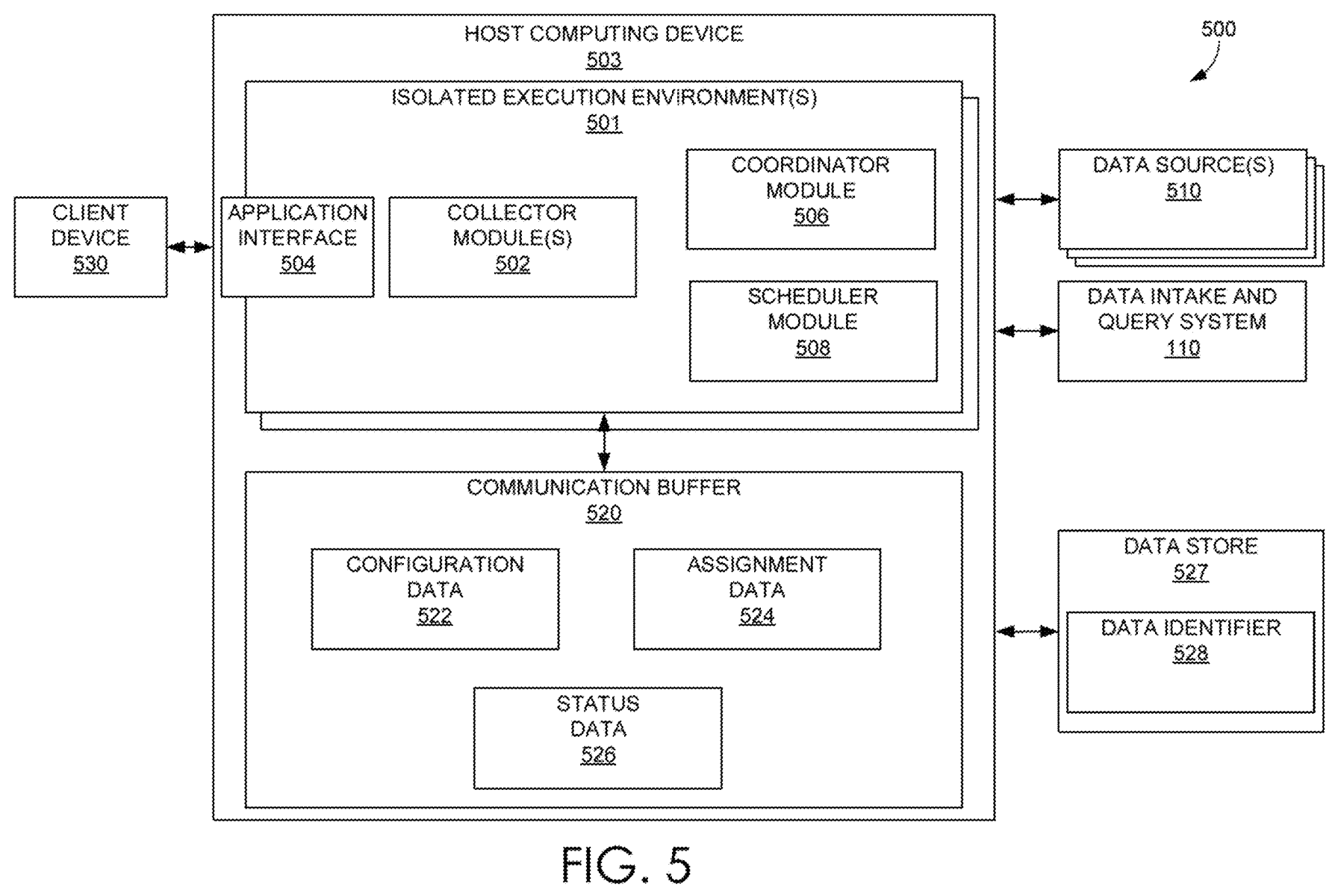

FIG. 5 is an example of a data ingestion environment 500. Specifically, FIG. 5 illustrates an example environment 500 that includes a host computing device 503, one or more data source(s) 510, a data intake and query system 110 (as described with respect to FIG. 1), a data store 527, and a client device 530. The host computing device 503 includes a worker instantiated as an isolated execution environment 501 and a communication buffer 520 (which may be referred to herein as a buffer). The communication buffer 520 stores configuration data 522, assignment data 524, and status data

526. The data store 527 stores a data identifier 528. The isolated execution environment 501 includes an application interface 504, one or more collector module(s) 502 (e.g., one or more collector processes), a coordinator module 506 (e.g., a coordinator process), and a scheduler module 508 (e.g., a scheduler process, an active scheduler module, etc.). It will be understood that the elements illustrated in FIG. 5 are for illustrative purposes only and that the environment 500 can include fewer, more, and/or different elements.

In some cases, the environment 500 may include multiple host computing devices 503, multiple client devices 530, multiple data intake and query systems 110, multiple data stores 527, etc. In some cases, the host computing device 503 may include multiple isolated execution environments 501 (all or a portion of which may be communicatively coupled to the communication buffer 520). In some cases, the communication buffer 520 may be separate and/or distinct from the host computing device 503.

The host computing device 503 (e.g., a hosted computing environment) may be an isolated execution environment system. For example, the host computing device 503 may be a device or system configured to host one or more isolated execution environments 501 using the compute resources of the host computing device 503 (e.g., memory, processor, etc.).

The client device 530 may be similar to and/or may include the computing device 104 as discussed with respect to FIG. 1. One or more applications may run on the client device 530. For example, the one or more applications may include an application to enable definition of data for ingestion to the host computing device 503. As described herein, in some cases, the client device 530 may include a user interface system (e.g., to enable definition of data for ingestion).

The one or more data source(s) 510 may be similar to and/or may include the data source 102 as discussed with respect to FIG. 1. In some cases, the host computing device 503, via the isolated execution environment 501, may pull data from the one or more data source(s) 510. In some cases, the one or more data source(s) 510 may push data to the host computing device 503, via the isolated execution environment. The one or more data source(s) 510 may include data files, directories of files, data sent over a network, event logs, registries, raw data (e.g., raw machine data), metrics, logs, etc. In some cases, the one or more data source(s) 510 may be implemented as a data store configured to store machine data or other types of data in one or more formats.

The one or more data source(s) 510 may form part of the host computing device 503 or may be a distinct source of data for consumption by the host computing device 503. In some cases, all or a portion of the one or more data source(s) 510 may correspond to a respective connector. For example, a first data source of the one or more data source(s) 510 may be a distinct source of data for consumption for a first connector, a second data source of the one or more data source(s) 510 may be a distinct source of data for consumption for a second connector, etc.

As discussed herein, the data intake and query system 110 may include one or more search heads, one or more indexers, one or more forwarders, one or more query coordinators, one or more worker nodes and the host computing device 503 may route data to the data intake and query system 110 for processing of the data. In some cases, the environment 500 may not include the data intake and query system 110. For example, the environment 500 may include the event collector 230 (as discussed herein) and the host computing device may route the data to the event collector 230 for processing of the data.

The data intake and query system 110 may obtain data from the host computing device 503 (e.g., data ingested via the isolated execution environment 501). In some cases, the data intake and query system 110 may process (e.g., index and store) the data for the execution of one or more queries.

As discussed herein, the host computing device 503 includes an isolated execution environment 501 and a communication buffer 520. The isolated execution environment 501 (or modules thereof) may be in communication with the communication buffer 520.

The isolated execution environment 501 (e.g., a virtual machine, a container, a pod, etc.) may share hardware compute resources (e.g., processor, memory, etc.) of the host computing device 503 with other isolated execution environments (e.g., instantiated on the host computing device 503). In some cases, the host computing device 503 shares its resources between a plurality of isolated execution environments 501. For example, the host computing device 503 (or a separate component) may assign each of the isolated execution environments 501 a partition of a data store or memory of the host computing device 503. In addition, the host computing device 503 (or a separate component) may assign each of the isolated execution environments 501 some portion of processing resources of the host computing device 503. In certain cases, some or all of the isolated execution environments 501 may be unaware of the existence of other execution environments 501 and may be configured to act as if they have all compute resources of a computing device. In some cases, one or more applications or processes can be executed in the isolated execution environment 501.

The communication buffer 520 may be a data buffer, a data store, etc. For example, the communication buffer 520 may be a region of memory for storing data (e.g., in a manner such that the data is accessible by one or more components as discussed herein). In certain cases, the communication buffer 520 may operate according to a publish-subscribe ("pub-sub") message model (e.g., may be implemented as part of pub-sub system). Components of the isolated execution environment 501 (e.g., the scheduler module 508, the coordinator module 506, the application interface 504, etc.) may obtain data (e.g., assignment data 524), and transform the data into a format suitable for publication on the communication buffer 520. Illustratively, the components may generate a message, and publish the message to the communication buffer 520. In one embodiment, the communication buffer 520 may format messages according to the communication buffer's 520 method of serializing structured data. Thus, the communication buffer 520 may convert data from an input format into a protocol buffer format. Generation of the message may include "tagging" the message with various information, which may be included as metadata for the data, and determining a "topic" for the message, under which the message should be published to the communication buffer 520. In general, the "topic" of a message may reflect a categorization of the message. After generation of a message, the components can publish the message to the communication buffer 520 under the determined topic. The communication buffer 520 can maintain a queue for each such topic, and enable components to "subscribe" to a given topic. As messages are published to the topic, the communication buffer 520 can function to transmit the messages to each subscriber, and ensure message resiliency until at least each subscriber has acknowledged receipt of the message (e.g., at which point the communication buffer 520 may delete the message). In this manner, the communication buffer 520 may function as a "broker" within the pub-sub model.

In the example of FIG. 5, the communication buffer 520 includes configuration data 522, assignment data 524, and the status data 526 and the data store 527 includes the data identifier 528.

The configuration data 522 may indicate an identifier of one or more connectors (e.g., Connector XYZ), a number of the one or more connectors, a number of collector modules (e.g., a level of parallelism), a connector and/or collector module status (e.g., alive or dead).

The assignment data 524 may indicate one or more connector-isolated execution environment assignments. For example, the assignment data 524 may indicate an assignment of a particular collector module to a particular isolated execution environment.

The status data 526 may indicate a status (e.g., state) of collector modules (e.g., of the one or more collector module (s) 502). For example, the status data 526 may indicate whether a particular collector module is running, failed, etc. In another example, the status data 526 may indicate whether control of a particular collector module is locked, unlocked, etc.

The data identifier 528 may identify data for ingest (e.g., by one or more collector modules). In one example, a collector module 502 assigned as cluster leader may provide (e.g., write, store, etc.) the data identifier 528 to the data store 527 and other collector modules corresponding to a same connector as the collector module 502 may obtain (e.g., read) the data identifier 528 from the data store 527.

The configuration data 522, the assignment data 524, the status data 526, and the data identifier 528 within the communication buffer 520 may be editable (e.g., storable, generatable, updatable, etc.) and/or readable by particular components of the isolated execution environment 501. For example, the application interface 504 can provide configuration data 522 (e.g., connector configuration data) to and store the configuration data 522 in the communication buffer 520. In another example, the scheduler module 508 can generate the assignment data 524 and store the assignment data 524 in the communication buffer 520. In another example, the coordinator module 506 can generate the status data 526 and store the status data 526 in the communication buffer 520.

In some cases, the configuration data 522, the assignment data 524, the status data 526, and the data identifier 528 may be readable by all or a portion of the one or more collector module(s) 502, the application interface 504, the coordinator module 506, and/or the scheduler module 508 of the isolated execution environment 501. In some cases, the configuration data 522, the assignment data 524, the status data 526, and the data identifier 528 may be readable by all or a portion of one or more respective collector module(s), a respective application interface, a respective coordinator module, and/ or a respective scheduler module of all or a portion of a plurality of isolated execution environments instantiated on the host computing device 503.

The application interface 504 may be a network interface, an application programming interface, etc. The application interface 504 may enable the isolated execution environment 501 to interface with (e.g., route data to and/or obtain data from) the client device 530. For example, the application interface 504 may define one or more data streams, filters, pipelines, data routes, etc. between the client device 530 and the isolated execution environment. In some cases, the application interface 504 may obtain instructions from the client device 530. For example, the instructions may define one or more connectors (e.g., one or more clusters of collector modules). In another example, the instructions may define a level of parallelism (e.g., a number of isolated execution environments for distribution of a cluster of collector modules).

The one or more collector module(s) 502, the application interface 504, the coordinator module 506, and/or the scheduler module 508 may be modules generated (e.g., instantiated, defined, implemented, etc.) within the isolated execution environment 501. For example, the isolated execution environment 501 and/or the host computing device 503 (e.g., using components outside the isolated execution environment 501) may generate a plurality of collector modules to ingest data from the one or more data source(s) 510.

As described herein, the application interface 504 can obtain instructions from the client device 530. For example, the instructions may include instructions to obtain data from the one or more data source(s) 510 using a particular number of collector modules, isolated execution environments, etc. Based on the instructions, the host computing device 503 (e.g., a component of the host computing device 503, etc.) can generate the configuration data 522 based on obtained instructions. In some cases, the application interface 504 may store the configuration data in the communication buffer 520.

In some cases, the instructions and/or the configuration data 522 may indicate a type of the one or more data source(s) 510. For example, the instructions and/or the configuration data 522 may indicate whether the one or more data source(s) 510 support parallel data reads (also referred to herein as a parallel-read data source) or do not support parallel data reads (also referred to herein as a non-parallel-read or serial-read data source).

In certain cases, the host computing device 503 can generate a scheduler module 508 outside of the isolated execution environment 501. For example, the host computing device 503 may generate the scheduler module 508 in its own isolated execution environment or execute as a process or module separate from the isolated execution environments 501.

The scheduler module can obtain the configuration data 522. The scheduler module 508 can determine a range of collector modules and a range of connector-specific collector modules for the isolated execution environment 501. For example, the scheduler module 508 can determine a minimum and/or a maximum number of collector modules for the isolated execution environment 501, a minimum and/or a maximum number of collector modules for a connector for the isolated execution environment 501, etc.

The scheduler module 508 may identify a number of isolated execution environments instantiated on the host computing device 503. Based on the determined range of collector modules, the determined range of connector-specific collector modules, and the number of isolated execution environments instantiated on the host computing device 503, the scheduler module 508 can assign the one or more collector module(s) 502 (and one or more connectors) to the isolated execution environment 501.

In some cases, the scheduler module 508 (or a different component of the isolated execution environment 501) may identify a collector module of the one or more collector module(s) 502 corresponding to a same connector that is elected as a cluster leader (e.g., by the one or more collector module(s) 502). In some cases, the one or more collector module(s) 502 corresponding to a same connector may implement a leader election process as described herein and the one or more collector module(s) 502 may assign the cluster leader based on the leader election process. For example, the or the one or more collector module(s) 502 (or the scheduler module 508) may assign a lease to a collector module indicating the collector module is the cluster leader. The one or more collector module(s) 502 may assign a collector module as a cluster leader based on determining the type of the one or more data source(s) 510 corresponds to a first type (e.g., indicating that the one or more data source(s) 510 do not support parallel reads).

Based on assigning the one or more collector module(s) 502 to the isolated execution environment 501, the scheduler module 508 can generate and store the assignment data 524 indicating the assignment of the one or more collector module(s) 502 in the communication buffer 520 (or update the assignment data 524 stored in the communication buffer 520).

The coordinator module 506 can obtain the assignment data 524 and the status data 526 (e.g., previously stored by the coordinator module 506) from the communication buffer 520. Based on the assignment data 524 and/or the status data 526, the coordinator module 506 can identify the one or more collector modules and a status of the one or more collector module(s) 502 and identify one or more collector modules to be generated by, terminated by, etc. the isolated execution environment 501 such that the one or more collector module(s) 502 (and a corresponding status) correspond to the one or more collector modules indicated by the assignment data 524 (and a corresponding status). Based on identifying the one or more collector modules to be generated, terminated, implemented, etc. by the isolated execution environment 501, the coordinator module 506 can generate, terminate, etc. one or more collector modules such that the one or more collector module(s) 502 (and a corresponding status) correspond to the one or more collector modules indicated by the assignment data 524 (and a corresponding status).

Based on generating, terminating, etc. one or more collector modules, the coordinator module 506 can generate and store the status data 526 in the communication buffer 520 indicating a status of the one or more collector module(s) 502 (or update status data 526 stored in the communication buffer 520).

The one or more collector module(s) 502 may ingest data and route data to the data intake and query system 110. In some cases, where the scheduler module 508 identifies a collector module 502 as a cluster leader, the cluster leader may obtain the data identifier 528 (e.g., blocks of data, work units, etc.) identifying data to be collected by the one or more collector module(s) 502. For example, the data identifier 528 may be an identification of data. The cluster leader can communicate the data identifier 528 to the data store 527 and the one or more collector module(s) 502 can obtain the data identifier 528 from the data store 527 and ingest the data based on the data identifier 528 stored in the data store 527.

As discussed herein, the host computing device 503 may include a plurality of isolated execution environments 501 and all or a portion of the plurality of isolated execution environments 501 may include a respective plurality of collector modules 502. The host computing device 503 may separately assign a number of isolated execution environments 501 to the host computing device 503, and, via the scheduler module 508, assign a respective plurality of collector modules to all or a portion of the plurality of isolated execution environments. In some cases, the scheduler module 508 may dynamically assign the collector modules to a plurality of connectors such that all or a portion of the collector modules associated with a particular connector obtain data from the same data source.

Figure 6:
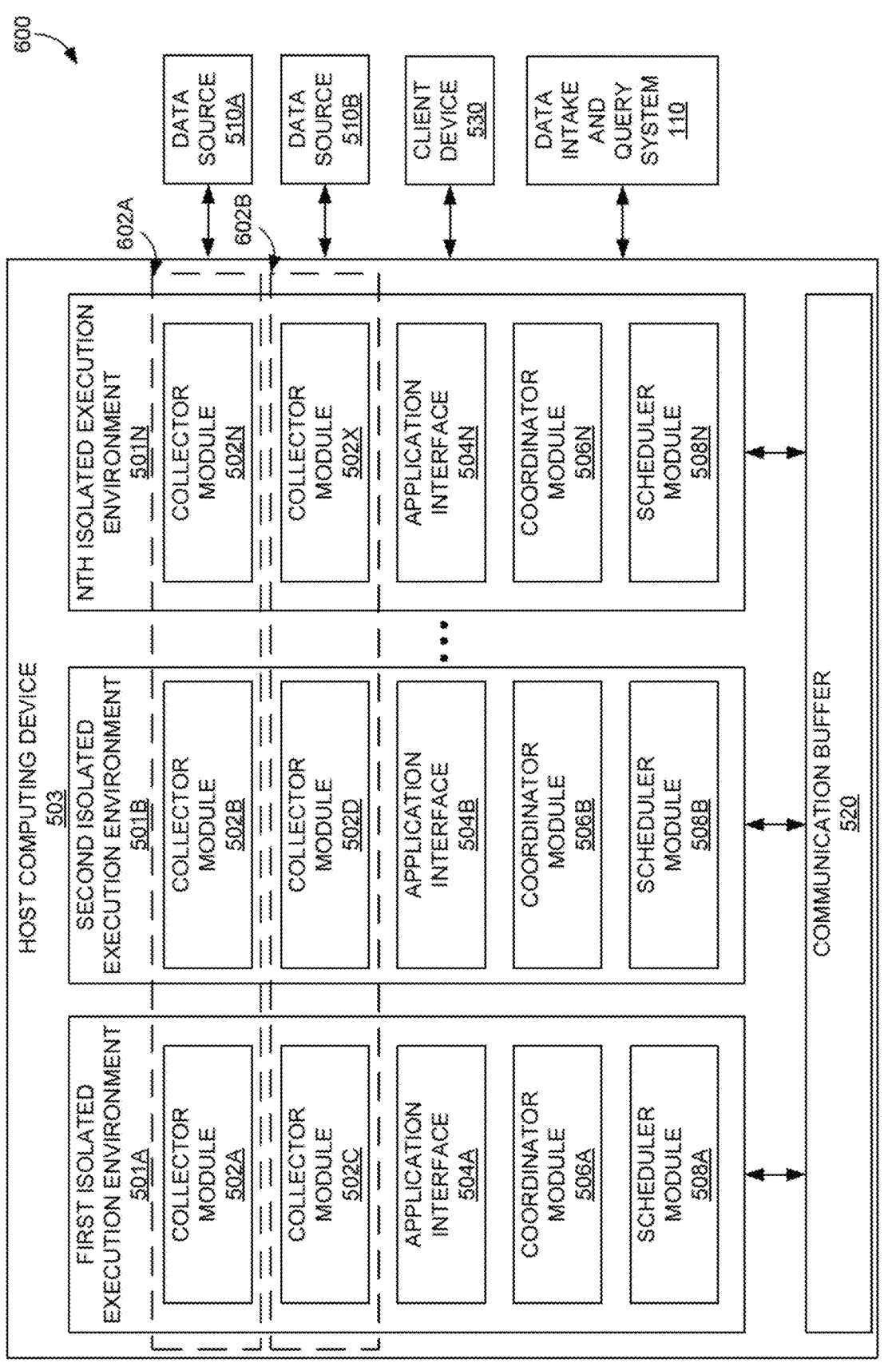
FIG. 6 is a block diagram of an example host computing device including multiple isolated execution environments to obtain data from a data source, in accordance with example embodiments.

FIG. 6 is an example of a data ingestion environment 600. The data ingestion environment 600 may be similar to the data ingestion environment 500 discussed herein with respect to FIG. 5. In the illustrated example of FIG. 6, the environment 600 includes a host computing device 503, a data source 510A and a data source 510B (individually or collectively referred to as data source 510), a data intake and query system 110 (as described with respect to FIG. 1), and a client device 530. It will be understood that the elements illustrated in FIG. 6 are for illustrative purposes only and that the environment 600 can include fewer, more, and/or different elements. For example, the host computing device 503 may include any number of isolated execution environments 501 and/or the isolated execution environments 501 may include any number of collector modules 502.

The data source 510A and the data source 510B may be separate and distinct data sources. In some cases, the data source 510A and the data source 510B may be different types of data sources. For example, the data source 510A may support parallel reads and the data source 510B may not support parallel reads. In some cases, the data source 510A and the data source 510B may be associated with different tenants. For example, the data source 510A may store, provide, etc. data associated with a first tenant and the data source 510B may store, provide, etc. data associated with a second tenant.

In the illustrated example, the host computing device 503 includes a first isolated execution environment 501A, a second isolated execution environment 501B, . . . , and an nth isolated execution environment 501N (individually or collectively referred to as isolated execution environment 501), where n can be any number, and a communication buffer 520. As discussed herein, the communication buffer 520 may store configuration data, assignment data, and/or status data.

The first isolated execution environment 501A, the second isolated execution environment 501B, . . . , and the nth isolated execution environment 501N may each include a respective application interface 504, one or more respective collector module(s) 502, a respective coordinator module 506, and a respective scheduler module 508. In the example of FIG. 6, the first isolated execution environment 501B includes collector module 502A, the collector module 502C, the application interface 504A, the coordinator module 506A, and the scheduler module 508A, the second isolated execution environment 501B includes collector module 502B, the collector module 502D, the application interface 504B, the coordinator module 506B, and the scheduler module 508B, and the nth isolated execution environment 501N includes collector module 502N, the collector module 502X, the application interface 504N, the coordinator module 506N, and the scheduler module 508N.

The host computing device 503 (or a component separate from or implemented by the host computing device 503 such as an autoscaler) may monitor the isolated execution environments 501A, 501B, . . . , 501N. For example, host computing device 503 may monitor the isolated execution environments 501A, 501B, . . . , 501N to determine a load associated with the isolated execution environments 501A, 501B, . . . , 501N, a load associated with a cluster of collector modules, etc. The host computing device 503 may determine the load satisfies (e.g., matches, is greater than, is less than, is within, etc.) a threshold (e.g., a threshold value, range, etc.), determine that one or more isolated execution environments should be spun up or spun down, and spin up or spin down the one or more isolated execution environments on the host computing device 503. For example, the host computing device 503 may determine the load satisfies a threshold and spin up an additional isolated execution environment on the host computing device 503 based on determining the load satisfies the threshold. The host computing device 503 may decouple the determination of whether to spin up or spin down isolated execution environments from the determination of whether to generate, terminate, transition, implement, etc. a collector module on a particular isolated execution environment.

As described herein, one or more application interfaces 504 of the application interface 504A, the application interface 504B, . . . , and/or the application interface 504N can obtain instructions from the client device 530. Based on the instructions, the one or more application interfaces 504 can store configuration data (e.g., based on the instructions) in the communication buffer 520.

The isolated execution environments 501A-501N (e.g., the scheduler modules 508A-508N) can assign an isolated execution environment to include and/or be an active scheduler module and one or more isolated execution environments to include and/or be standby scheduler modules. The isolated execution environments 501A-501N can assign the first isolated execution environment 501A, the second isolated execution environment 501B, . . . , or the nth isolated execution environment 501N to include and/or be the active scheduler module, or cause the host computing device 503 to instantiate a separate process or module or separate isolated execution environment to include and/or be the active scheduler module. In the example of FIG. 6, the isolated execution environments 501A-501N can assign the scheduler module 508A (of the first isolated execution environment 501A) as the active scheduler module (e.g., the scheduler module 508A may be active scheduler module 508A based on the assignment) and the scheduler modules 508B-508N (of the second isolated execution environments 501B, . . . , and the nth isolated execution environment 501N) as standby scheduler modules (e.g., the scheduler modules 508B-508N may be standby scheduler modules 508B-508N). For example, the standby scheduler modules may be dormant scheduler modules, inactive scheduler modules, etc. While reference may be made to active scheduler module 508A or standby scheduler modules 508B-508N, any of the scheduler modules 508A-508N may be the active scheduler module or one of the standby scheduler modules.

In some cases, the first isolated execution environment 501A, the second isolated execution environment 501B, . . . , and/or the nth isolated execution environment 501N can identify a scheduler module as an active scheduler module or a standby scheduler module using a leader election process (e.g., a scheduler election process) as implemented by the first isolated execution environment 501A, the second isolated execution environment 501B, . . . , and/or the nth isolated execution environment 501N. In the leader election process, the first isolated execution environment 501A, the second isolated execution environment 501B, . . . , and/or the nth isolated execution environment 501N may campaign to include and/or be the active scheduler module. For example, the first isolated execution environment 501A, the second isolated execution environment 501B, . . . , and/or the nth isolated execution environment 501N may attempt to write to the communication buffer 520 indicating that the respective isolated execution environment includes and/or is the active scheduler module. If an isolated execution environment is able to write to the communication buffer 520 to indicate that the isolated execution environment includes and/or is the active scheduler module (e.g., isolated execution environments have not previously written or within a particular time period written to the communication buffer 520 to claim the active scheduler module), the isolated execution environments can identify the scheduler module of the isolated execution environment as the active scheduler module.

In some cases, the isolated execution environments may implement a first leader election process to define an active scheduler module and a cluster of collector modules may implement a second leader election process to define a cluster leader as described herein.

The scheduler modules 508A, 508B, 508C may confirm that the scheduler modules 508A, 508B, 508C are active (e.g., attempt to claim or reclaim a position as the active scheduler module) by writing a status (e.g., periodically, aperiodically) to the communication buffer 520 (e.g., indicating that the respective scheduler module is performing operations). If the active scheduler module (e.g., active scheduler module 508A) fails to confirm that the active scheduler module is active, a previously standby scheduler module (e.g., scheduler modules 508B, 508C) may be assigned to be the active scheduler module (e.g., based on writing to the communication buffer 520) such that the host computing device 503 can periodically or a periodically confirm that one of the scheduler modules 508A, 508B, 508C is the active scheduler module.

In some cases, the first isolated execution environment 501A, the second isolated execution environment 501B, . . . , and/or the nth isolated execution environment 501N can assign a scheduler module as an active scheduler module or a standby scheduler module based on a status, a workload, etc. of the scheduler modules 508A, 508B, . . . , 508N.

Based on assignment of the scheduler module 508A to be the active scheduler module, the active scheduler module 508A can obtain the configuration data from the communication buffer 520. The active scheduler module 508A can determine a range of collector modules and a range of connector-specific collector modules based on the configuration data.

Based on the determined range of collector modules and the determined range of connector-specific collector modules, the active scheduler module 508A can assign collector modules to all or a portion of the first isolated execution environment 501A, the second isolated execution environment 501B, . . . , and/or the nth isolated execution environment 501N. In the example of FIG. 6, the active scheduler module 508A (e.g., based on a designation of the scheduler module 508A as the active scheduler module) assigns collector module 502A and collector module 502C to the first isolated execution environment 501A, collector module 502B and collector module 502D to the second isolated execution environment 501B, . . . , and collector module 502N and collector module 502X to the nth isolated execution environment 501N. It will be understood that any number of collector modules 502 may be assigned to the different isolated execution environments 501, and that a different number of collector modules 502 may be assigned to the different isolated execution environments 501. For example, the first isolated execution environment 501A may be assigned one collector module 502 and the second isolated execution environment 501B may be assigned five collector modules 502

In some cases, to assign collector modules to all or a portion of the first isolated execution environment 501A, the second isolated execution environment 501B, . . . , and/or the nth isolated execution environment 501N, the active scheduler module 508A (e.g., based on a designation of the scheduler module 508A as the active scheduler module) can distribute load among the first isolated execution environment 501A, the second isolated execution environment 501B, . . . , and/or the nth isolated execution environment 501N. For example, the active scheduler module 508A can perform load balancing. In some cases to perform the load balancing, the active scheduler module 508A can balance the load among the first isolated execution environment 501A, the second isolated execution environment 501B, . . . , and the nth isolated execution environment 501N by balancing the number of collector modules instantiated on all or a portion of the isolated execution environments (e.g., the active scheduler module 508A may assign three collector modules to each isolated execution environment). In some cases to perform the load balancing, the active scheduler module 508A can balance the load among the first isolated execution environment 501A, the second isolated execution environment 501B, . . . , and the nth isolated execution environment 501N by balancing processor (e.g., CPU) utilization, memory utilization, or any other load associated with all or a portion of the isolated execution environments 501A, 501B, . . . , 501N. For example, the active scheduler module 508A may assign collector modules to each isolated execution environment such that each of the isolated execution environments 501A, 501B, . . . , 501N has a same CPU utilization or is within a threshold (e.g., a threshold range) of a particular CPU utilization. In some cases, the active scheduler module 508A may include and/or may implement a load calculator to determine the load.

Based on the determined range of collector modules and/or the determined range of connector-specific collector modules, the active scheduler module 508A can define a plurality of connectors (e.g., clusters of collector modules to obtain data from the same data source). In the example of FIG. 6, the active scheduler module 508A assigns at least three collector modules (e.g., collector module 502A of the first isolated execution environment 501A, collector module 502B of the second isolated execution environment 501B, . . . , and collector module 502N of the nth isolated execution environment 501N) to a first connector 602A and assigns at least three collector modules (e.g., collector module 502C of the first isolated execution environment 501A, collector module 502D of the second isolated execution environment 501B, . . . , and collector module 502X of the nth isolated execution environment 501N) to a second connector 602B. The first connector 602A may include a cluster of collector modules 502A, 502B, . . . 502N to obtain data from the data source 510A and the second connector 602B may include a cluster of collector modules 502C, 502D, . . . , 502X to obtain data from the data source 510B.

Based on assigning the collector modules 502A, 502B, 502C, 502D, . . . , 502N, 502X and defining the connectors 602A, 602B, the active scheduler module 508A can generate and store the assignment data in the communication buffer 520 indicating the assignment of the collector modules 502A, 502B, 502C, 502D, . . . , 502N, 502X to the first isolated execution environment 501A, the second isolated execution environment 501B, . . . , and/or the nth isolated execution environment 501N and to the first connector 602A and/or the second connector 602B.

All or a portion of the coordinator modules 506A, 506B, . . . , 506N can obtain the assignment data and status data from the communication buffer 520. Based on the assignment data and/or the status data, all or a portion of the coordinator modules 506A, 506B, . . . , 506N can identify the one or more collector modules assigned to the associated isolated execution environment and a status of one or more collector modules (e.g., generated by the associated isolated execution environment, generated by another isolated execution environment, terminated, awaiting termination, etc.). All or a portion of the coordinator modules 506A, 506B, . . . , 506N can identify one or more collector modules to be generated by, terminated by, etc. the associated isolated execution environment 501 based on the assignment data and the status data.

The collector modules 502A, 502B, 502C, 502D, . . . , 502N, 502X may ingest data (from the data sources 510A, 510B) and route data to the data intake and query system 110. All or a portion of the coordinator modules 506A, 506B, . . . , 506N can generate and store the status data in the communication buffer 520 indicating a status of the collector modules 502A, 502B, 502C, 502D, . . . , 502N, 502X

In some cases, as discussed herein, the active scheduler module 508A may identify a collector module of all or a portion of the isolated execution environments 501A, 501B, . . . , 501N as a cluster leader (e.g., based on a leader election process implemented by the collector modules 502 of a particular connector). For example, for all or a portion of the connectors, the collector modules 502 of a particular connector may assign a collector module of a connector (e.g., collector module 502B of the first connector 602A) as a cluster leader for the connector. In certain cases, the collector modules 502 of a particular connector may determine which of them will be the cluster leader. In some such cases, the collector modules 502 of a particular connector may perform a similar process as the scheduler modules 508 do when determining which scheduler module is to be the active scheduler module (e.g., leader election).

The cluster leader may obtain, from a data source, data identifiers (e.g., identifying blocks of data) identifying data to be collected from the data source by collector modules of the same connector. The cluster leader can communicate the data identifiers to the data store 527 (as data identifiers 528). The collector modules of the same connector can obtain the data identifiers 528 from the data store 527 and ingest the data from the data source using the data identifiers 528 from the data store 527.

2.2. Ingesting Data Using Isolated Execution Environments

As described herein, the host computing device 503 can ingest data utilizing isolated execution environments instantiated on the host computing device 503 and collector modules instantiated on the isolated execution environments. The host computing device 503 can utilize the collector modules to ingest data from one or more data sources.

The techniques described herein can enable the host computing device 503 to assign (e.g., scale and/or balance) the isolated execution environments based on a status of collector modules, connector-isolated execution environment assignments, and/or configuration data as stored via the communication buffer 520. The host computing device 503, via the isolated execution environments, can assign (e.g., scale and/or balance) collector modules between the isolated execution environments. The host computing device 503 can adjust ingestion of data by dynamically assigning the isolated execution environments and/or the collector modules.

In some cases, systems may be unable to dynamically assign isolated execution environments and/or collector modules. For example, the collector modules may be unable to perform self-load balancing and/or self-scaling. This can cause inefficiencies as varying amounts of data may be ingested by the host computing device 503. Further, a number of isolated execution environments, a number of collector modules, a level of parallelism (e.g., a number of isolated execution environments for distribution of a cluster of collector modules), etc. may also vary. To facilitate ingestion of data in a reliable and efficient manner, it may be helpful for a system to dynamically assign the isolated execution environments and/or the collector modules. In doing so, the system may better distribute processing tasks to computer components with more resources thereby increasing system throughput. In this way, the system may process more data in less time and/or improve system resiliency in the event an isolated execution environment crashes.

Figure 7:
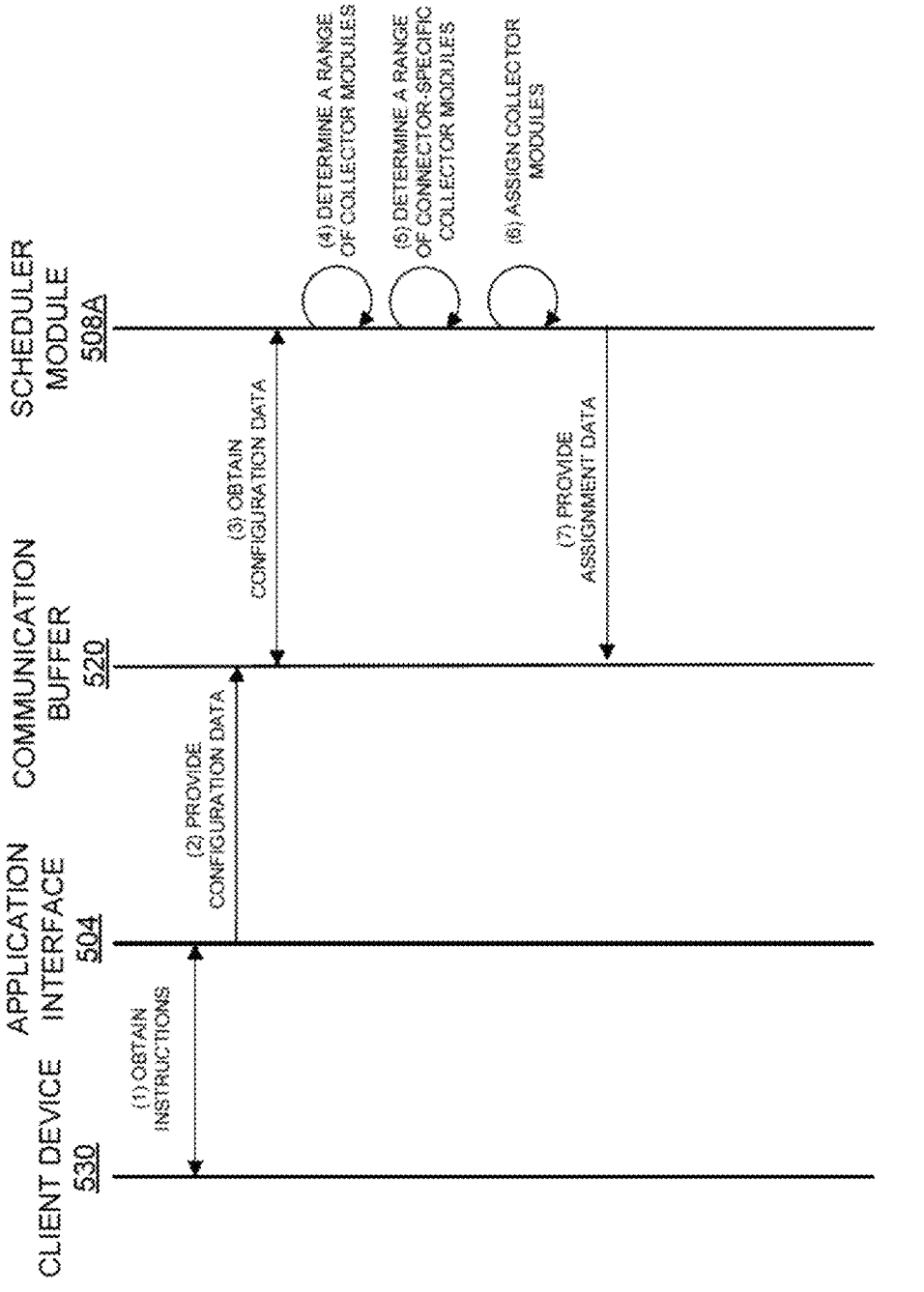
FIG. 7 is a data flow diagram illustrating an example of data flow and communications illustrating an example method for generation of instructions for collector modules and/or coordinator modules.

FIG. 7 is a data flow diagram illustrating an example of data flow and communications between a variety of the components of a data ingestion system, such as the host computing device 503, or an isolated execution environment 501 of the host computing device 503, as described with respect to FIGS. 5 and 6, for ingesting data. The data flow diagram of FIG. 7 illustrates an example of data flow and communications between the application interface 504, the scheduler module 508A (e.g., designated as the active scheduler module based on a leader election process), the communication buffer 520, and the client device 530. The application interface 504 and the active scheduler module 508A may be instantiated within an isolated execution environment 501, which may be instantiated by the host computing device 503 and may be in communication with the communication buffer 520. However, it will be understood that in some cases, one or more of the functions described herein with respect to FIG. 7 can be omitted, performed concurrently or in a different order and/or performed by a different component of the data ingestion system. Accordingly, the illustrated example and description should not be construed as limiting. Moreover, although one application interface 504, one scheduler module 508A, one communication buffer 520, and one client device 530 are shown, it will be understood that multiple isolated execution environments and/or communication buffers 520 may be instantiated on the host computing device 503 and multiple application interfaces 504 may communicate with the client device 530, multiple isolated execution environments (e.g., multiple scheduler modules) may attempt to be elected as the active scheduler module, etc. In some cases, multiple client devices 530 may provide instructions to the host computing device 503.

Although not illustrated in FIG. 7, to perform various operations noted below, the data ingestion system may include a separate component (e.g., a host computing device load balancer) to balance the load and/or assign isolated execution environments to the host computing device 503.

At (1), the application interface 504 obtains instructions from the client device. The instructions may include instructions to ingest data from one or more data sources. In some cases, the instructions may include instructions to ingest data using a number of collector modules, a number of isolated execution environments, a number of connectors, etc. For example, the instructions may indicate a level of parallelism (e.g., a number of isolated execution environments for generation of collector modules of a connector) for ingest of the data.

A component of the host computing device 503 may generate configuration data (e.g., based on the instructions). The configuration data may indicate an identifier of one or more connectors, a number of collector modules, a collector module status, a connector status, etc. In some cases, the configuration data may indicate a number of isolated execution environments and/or collector modules requested for the ingest of the data and/or instantiated by the host computing device 503.

The communication buffer 520 may include an identification of the active scheduler module 508A (e.g., based on a leader election process implemented by a plurality of isolated execution environments). The communication buffer 520 may include an identification of an isolated execution environment defined as including and/or being the active scheduler module in the communication buffer. In some cases, a plurality of isolated execution environments may perform a leader election process such that the plurality of isolated execution environments may define a first isolated execution environment to successfully claim the position of the active scheduler module (e.g., by writing the claim to the communication buffer 520) as including and/or being the scheduler module 508A. For example, the plurality of isolated execution environments may assign a lease to an isolated execution environment indicating the scheduler module 508A of the isolated execution environment is the active scheduler module.

In some cases, the isolated execution environments may assign an isolated execution environment as including and/or being the active scheduler module. For example, the isolated execution environments may assign an isolated execution environment as including and/or being the active scheduler module based on a workload of the isolated execution environments.

In some cases, all or a portion of the plurality of isolated execution environments 501 may include a scheduler module 508. The scheduler module 508A may be active (e.g., activated) based on the leader election process and each other scheduler module be inactive (e.g., deactivated, standby, etc.).

In some cases, an isolated execution environment 501 (e.g., a scheduler module 508A of the isolated execution environment 501) may periodically or aperiodically write to the communication buffer 520 to reclaim the position as the active scheduler module and each other isolated execution environment 501 (e.g., each other scheduler module 508 of each other isolated execution environment 501) may write to the communication buffer 520 to attempt to claim the position as the active scheduler module. If the scheduler module 508A fails to reclaim the position as the active scheduler module within a particular time period (e.g., every five seconds, every ten seconds, etc.), a standby scheduler module (from another isolated execution environment 501) may claim the position as the active scheduler module by writing to the communication buffer 520. In some such cases, the formerly active scheduler module (e.g., scheduler module 508A) may become a standby scheduler module. For example, if the scheduler module 508A goes down, disconnects, etc., a another scheduler module (e.g., standby scheduler modules) may claim the position as the active scheduler module.

At (2), the application interface 504 provides (e.g., routes) configuration data (e.g., based on the instructions) to the communication buffer 520. For example, the application interface 504 may store the configuration data within the communication buffer 520. In some cases, the application interface 504 may provide the instructions as configuration data for storage within the communication buffer 520.

At (3), the active scheduler module 508A obtains the configuration data from the communication buffer 520. The active scheduler module 508A may periodically or aperiodically request configuration data from the communication buffer 520 to determine if configuration data (e.g., updated configuration data) is stored in the communication buffer 520. For example, the active scheduler module 508A may monitor the communication buffer 520 and may obtain the configuration data based on monitoring the communication buffer 520.

At (4), the active scheduler module 508A determines a range of collector modules (e.g., for all or a portion of the isolated execution environments). For example, the range of collector modules may indicate a range of collector modules for generation by an isolated execution environment. In another example, the range of collector modules may indicate a minimum and/or a maximum number of collector modules for generation by an isolated execution environment. In some cases, the range of collector modules may indicate a first range (e.g., a first minimum and/or a first maximum number) of collector modules for generation by a first isolated execution environment, a second range (e.g., a second minimum and/or a second maximum number) of collector modules for generation by a second isolated execution environment, etc.

The active scheduler module 508A may determine the range of collector modules based on the configuration data. To determine the range of collector modules, the active scheduler module 508A may divide the number of collector modules (e.g., as indicated by the configuration data) by the number of isolated execution environments instantiated on the host computing device 503 to generate a quotient and may determine the range of collector modules based on the quotient. For example, the number of collector modules may be 6 and the number of isolated execution environments may be 4 such that the quotient is 1.5 and the active scheduler module 508A may determine the range of collector modules as 1-2 collector modules for all or a portion of the isolated execution environments.

At (5), the active scheduler module 508A determines a range of connector-specific collector modules (e.g., for a particular connector of an isolated execution environment). For example, the range of connector-specific collector modules may indicate a range of connector-specific collector modules for generation by an isolated execution environment for a particular connector. In another example, the range of connector-specific collector modules may indicate a minimum and/or a maximum number of collector modules for generation by an isolated execution environment for a particular connector. In some cases, the range of collector modules may indicate a first range (e.g., a first minimum and/or a first maximum number) of collector modules for generation by a first isolated execution environment for a first connector, a second range of collector modules for generation by a second isolated execution environment for the first connector, a third range of collector modules for generation by the first isolated execution environment for a second connector, a fourth range of collector modules for generation by the second isolated execution environment for the second connector, etc.

The active scheduler module 508A may determine the range of connector-specific collector modules based on the configuration data. To determine the range of connector-specific collector modules, the active scheduler module 508A may divide the number of collector modules for a particular connector (e.g., as indicated by the configuration data) by a level of parallelism (or the number of isolated execution environments instantiated on the host computing device 503) to generate a quotient and may determine the range of connector-specific collector modules based on the quotient. For example, the number of collector modules for a particular connector may be 7 and the level of parallelism may be 3 such that the quotient is 2.33 and the active scheduler module 508A may determine the range of connector-specific collector modules as 2-3 collector modules for a particular connector of an isolated execution environment.

The range of collector modules and/or the range of connector-specific collector modules may be based on a particular deviation from the corresponding quotient (e.g., the closest whole numbers, a deviation of 1, deviation of 2, etc. with respect to the quotient). For example, if the quotient is 2.4, a range may be 2-3, 1-4, 0-5, etc. and if the quotient is 2, the range may be 2, 1-3, 0-4, etc.

In some cases, the active scheduler module 508A may determine an isolated execution environment 501 has been added or removed from the host computing device 503 (e.g., the host computing device 503 generated or terminated an isolated execution environment), an update to the configuration data (e.g., indicating an updated number of collector modules, an updated number of connectors, an updated level of parallelism, etc.), etc. Based on determining the isolated execution environment has been added or removed and/or the update to the configuration data, the active scheduler module 508A can redetermine the range (or determine a new range) of collector modules and/or the range of connector-specific collector modules and reassign the collector modules 502.

At (6), the active scheduler module 508A assigns collector modules (e.g., to balance a workload between isolated execution environments). The active scheduler module 508A can assign the collector modules 502 to the isolated execution environments 501 based on the determined ranges, the determined number of isolated execution environments, the determined level of parallelism, etc. For example, for all or a portion of the connectors, the active scheduler module 508A can assign one or more collector modules 502 to a first isolated execution environment 501, one or more collector modules 502 to a second isolated execution environment 501, etc. based on the determined ranges.

In some cases, the cluster of collector modules (or the active scheduler module 508A) may determine a type of data source (e.g., associated with the data for ingestion). For example, a collector module of the cluster of collector modules may determine a type of the data source. In another example, a collector module of the cluster of collector modules that is assigned to a same isolated execution environment as the active scheduler module 508A may determine the type of the data source. The cluster of collector modules may determine the type of the data source (e.g., whether the data source support parallel reads or does not support parallel reads) based on the configuration data. For example, the cluster of collector modules may determine whether or not the data source provides native coordination for components to read data in parallel.

In some cases, based on determining the type of data source (e.g., based on determining the data source provides native coordination for components and/or does support parallel reads), the cluster of collector modules of a particular connector can utilize the native coordination provided by the data source to obtain data. In some such cases, the various collector modules may communicate with the data source (directly) to obtain data identifiers of the data to be ingested and to obtain the data corresponding to the data identifiers. Moreover, the data source may track the data that has been ingested by the collector modules.

In some cases, based on determining the type of data source (e.g., based on determining the data source does not provide native coordination for components and/or does not support parallel reads), the active scheduler module 508A can identify a collector module of the cluster of collector modules of a particular connector assigned to ingest data from the data source as a cluster leader (e.g., as assigned by the cluster of collector modules via a leader election process). The active scheduler module 508A may identify the collector module as the cluster leader to identify data for ingestion and to store a data identifiers 528 (e.g., an identification of different portions of the data to be ingested) in the data store 527. In certain cases, the collector modules may determine amongst themselves which of the collector modules is to be the cluster leader. In some cases, the collector modules can elect one of them to be the cluster leader (or to change the cluster leader) in a manner similar to the way in which a scheduler module is selected to be the active scheduler module.

In some cases, the active scheduler module 508A may determine that the collector modules 502 assigned to the plurality of isolated execution environments 501 do not satisfy (e.g., is greater than, is less than, is not within, etc.) the determined ranges. For example, the active scheduler module 508A may determine that a number of collector modules 502 assigned to an isolated execution environment 501 and/or a number of collector modules 502 of a particular connector assigned to an isolated execution environment 501 does not satisfy the determined ranges. Based on determining that the collector modules 502 assigned to the plurality of isolated execution environments do not satisfy the determined ranges, the active scheduler module 508A can reassign (e.g., re-sort) the collector modules between the isolated execution environments.

At (7), the active scheduler module 508A provides assignment data to the communication buffer. The assignment data may indicate the assignment of the collector modules to the plurality of isolated execution environments (e.g., the quantity of collector modules assigned to some or all of the isolated execution environments and/or the quantity of connector-specific collector modules assigned to some or all of the isolated execution environments), the assignment of a collector module as a cluster leader, etc.

Fewer, more, or different steps may be included in the data flow diagram. For example, any one or any step described herein with FIG. 7 may be used with any one or any combination of steps described herein with reference to FIG. 8 and/or FIG. 9.

Figure 8:
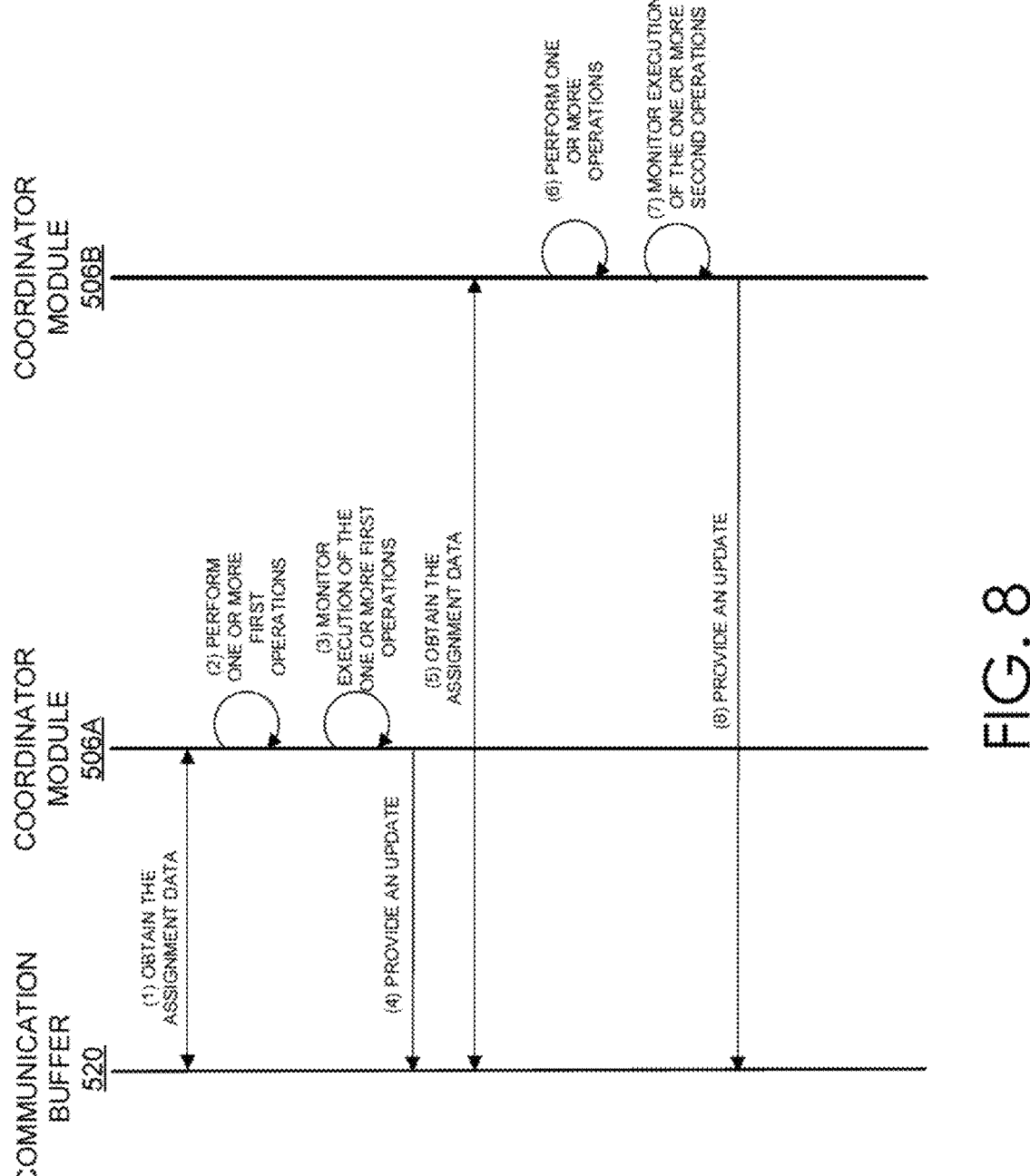
FIG. 8 is a data flow diagram illustrating an example of data flow and communications illustrating an example method for obtaining data using collector modules based on obtained instructions.

FIG. 8 is a data flow diagram illustrating an example of data flow and communications between a variety of the components of a data ingestion system, such as the host computing device 503 as described with respect to FIGS. 5 and 6, for ingesting data. The data flow diagram of FIG. 8 illustrates an example of data flow and communications between the coordinator module 506A, the coordinator module 506B, and the communication buffer 520. The coordinator module 506A may be instantiated on the first isolated execution environment 501A and the coordinator module 506B may be instantiated on the second isolated execution environment 501B. However, it will be understood that in some cases, one or more of the functions described herein with respect to FIG. 8 can be omitted, performed concurrently or in a different order and/or performed by a different component of the data ingestion system. Accordingly, the illustrated example and description should not be construed as limiting. Moreover, although two coordinator modules 506, and one communication buffer 520 are shown, it will be understood that the host computing device 503 may include more, less, or different components.

The steps of the data flow diagram of FIG. 8 may occur after the steps of the data flow diagram of FIG. 7. For example, step (1) of the data flow diagram of FIG. 8 may occur in response to and/or after step (10) of the data flow diagram of FIG. 7.

At (1), the coordinator module 506A obtains the assignment data from the communication buffer 520. The coordinator module 506A may periodically or aperiodically request the assignment data from the communication buffer 520 to determine if assignment data (e.g., updated assignment data) is stored in the communication buffer 520. For example, the coordinator module 506A may monitor the communication buffer 520 and may obtain the assignment data based on monitoring the communication buffer 520.

At (2), the coordinator module 506A performs one or more first operations. Based on the assignment data, the coordinator module 506A may determine whether to generate, terminate, implement, etc. a collector module on the associated isolated execution environment. For example, the coordinator module 506A may compare collector modules indicated by the assignment data to collector modules instantiated on the isolated execution environment and determine whether to terminate, generate, implement, etc. a collector module.

The one or more first operations may include an operation to generate or terminate one or more collector modules. In some cases, the one or more first operations may include an operation to cause one or more collector modules to ingest data from a data source. For example, the one or more first operations may include one or more collection operations (e.g., stop a collector module from collecting data, start a collector module collecting data, etc.).

At (3), the coordinator module 506A monitors executions of the one or more first operations (e.g., collection operations). For example, the coordinator module 506A may monitor the termination, generation, implementation, etc. of one or more collector modules.

At (4), the coordinator module 506A provides an update (e.g., as a status of collector modules) to the communication buffer 520. For example, the coordinator module 506A may update the status of collector modules stored in the communication buffer 520. The coordinator module 506A may provide the update in response to determining the one or more first operations are executed. The update may indicate one or more collector modules are terminated, generated, etc. by an isolated execution environment, one or more collector modules are assigned to a particular connector, etc.

At (5), the coordinator module 506B obtains the assignment data from the communication buffer 520. The coordinator module 506B may periodically or aperiodically request assignment data from the communication buffer 520 to determine if assignment data (e.g., updated assignment data) is stored in the communication buffer 520. In some cases, the coordinator module 506A and the coordinator module 506B may obtain the assignment data at the same or different time periods.

In some cases, the coordinator module 506B may obtain a status of collector modules from the communication buffer 520. The status of collector modules may indicate a status of collector modules of the plurality of isolated execution environments (e.g., whether a particular collector module assigned to the isolated execution environment of the coordinator module 506B is terminated).

At (6), the coordinator module 506B performs one or more second operations. Based on the assignment data, the coordinator module 506B may determine whether to generate, terminate, etc. a collector module on the associated isolated execution environment. The one or more second operations may include an operation to generate, terminate, and/or cause one or more collector modules to ingest data from a data source.

In some cases, if the one or more second operations include an operation for a first isolated execution environment to generate a collector module previously generated by a second isolated execution environment, the coordinator module 506B may confirm that the collector module previously generated by the second isolated execution environment has been terminated by the second isolated execution environment prior to generating the collector module on the first isolated execution environment based on the status of the collector modules. If the coordinator module 506B is unable to confirm that the collector module previously generated by the second isolated execution environment has been terminated by the second isolated execution environment and/or determines that the collector module has not been terminated by the second isolated execution environment, the coordinator module 506B may not transition the collector module (e.g., to the first isolated execution environment).

At (7), the coordinator module 506B monitors execution of the one or more second operations. For example, the coordinator module 506B may monitor the termination, generation, implementation, etc. of one or more collector modules.

At (8), the coordinator module 506B provides an update (e.g., as a status of collector modules) to the communication buffer 520. The coordinator module 506B may provide the update in response to determining the one or more first operations are executed. The update may indicate one or more collector modules are terminated, generated, etc. by an isolated execution environment, one or more collector modules are assigned to a particular connector, etc.

Fewer, more, or different steps may be included in the data flow diagram. For example, any one or any step described herein with FIG. 8 may be used with any one or any combination of steps described herein with reference to FIG. 7 and/or FIG. 9.

Figure 9:
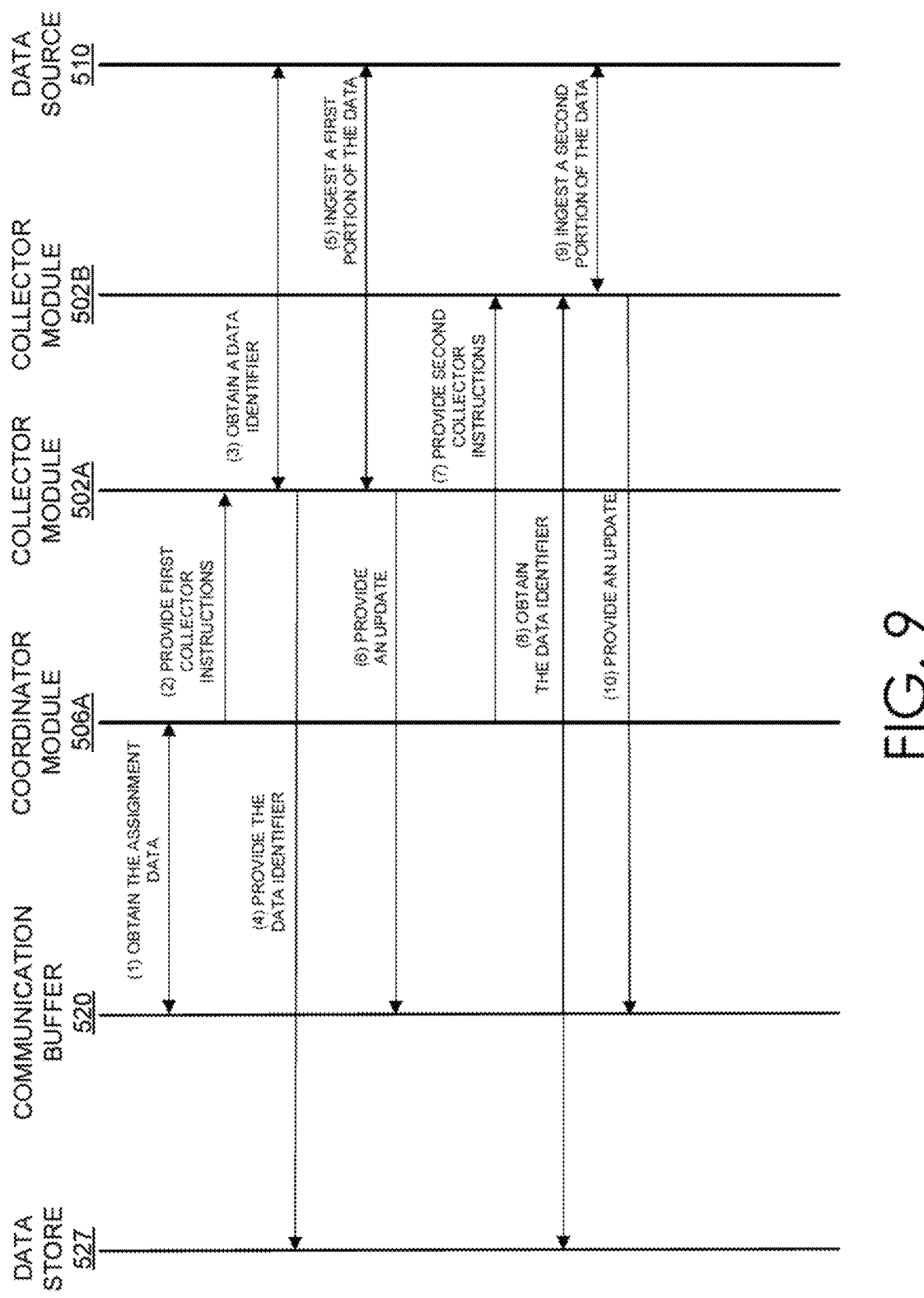
FIG. 9 is a data flow diagram illustrating an example of data flow and communications illustrating an example method for coordinating collector module, by a coordinator module, to obtain data from a data source.

FIG. 9 is a data flow diagram illustrating an example of data flow and communications between a variety of the components of a data ingestion system, such as the host computing device 503 as described with respect to FIGS. 5 and 6, for ingesting data. The data flow diagram of FIG. 9 illustrates an example of data flow and communications between the collector module 502A, the collector module 502B, the coordinator module 506A, the data source 510, and the communication buffer 520. The collector modules 502A, 502B and the coordinator module 506A may be instantiated on the first isolated execution environment 501A. However, it will be understood that in some cases, one or more of the functions described herein with respect to FIG. 9 can be omitted, performed concurrently or in a different order and/or performed by a different component of the data ingestion system. Accordingly, the illustrated example and description should not be construed as limiting. Moreover, although two collector modules 502, one coordinator module 506, one data source 510, and one communication buffer 520 are shown, it will be understood that the host computing device 503 may include more, less, or different components.

The steps of the data flow diagram of FIG. 9 may occur after the steps of the data flow diagram of FIG. 7. For example, step (1) of the data flow diagram of FIG. 9 may occur in response to and/or after step (10) of the data flow diagram of FIG. 7.

At (1), the coordinator module 506A obtains the assignment data from the communication buffer 520. As discussed herein, the coordinator module 506A may periodically or aperiodically request the assignment data from the communication buffer 520 and obtain the assignment data. The assignment data may indicate a cluster of collector modules (including the collector module 502A and the collector module 502B) to ingest data from the data source 510.

At (2), the coordinator module 506A provides first collector instructions to the collector module 502A. The coordinator module 506A may obtain (e.g., generate) the first collector instructions based on the assignment data. The first collector instructions may include instructions to cause the collector module 502A to obtain a data identifier of the data for ingest (e.g., based on an assignment of the collector module 502A as a cluster leader).

The collector module 502A may provide an indication to the coordinator module 506A indicating that the collector module 502A is a cluster leader (e.g., based on a leader election process conducted by a plurality of collector modules) and the coordinator module 506A may provide the first collector instructions to the collector module 502A based on the indication that the collector module 502A is the cluster leader. In some cases, the collector module 502A (or a separate component) may store an identification of the collector module 502A as the cluster leader in the communication buffer 520 and the coordinator module 506A may obtain the identification of the collector module 502A as the cluster leader from the communication buffer 520.

In some cases, the coordinator module 506A may determine that the assignment data indicates that the collector module 502A is assigned as a cluster leader to obtain the data identifier of the data for ingest. For example, an active scheduler module may determine that the data source 510 does not support parallel reads, may identify a cluster leader from a plurality of collector modules as selected by the plurality of collector modules based on a leader election process conducted by the plurality of collector modules, and may generate the assignment data. In some cases, the plurality of collector modules may assign the collector module 502A as a cluster leader.

At (3), the collector module 502A obtains a data identifier of data (e.g., block data, blocks of data, etc.) from the data source 510. For example, the collector module 502A may obtain a data identifier that includes an identification of a location of data, an address of data, etc. to be ingested from the data source.

At (4), the collector module 502A provides the data identifier to the data store 527. The collector module 502 may store the data identifier within the data store 527 for access by the cluster of collector modules.

In some cases, the collector module 502A (or a separate component) may update the data identifier to assign particular portions of the data corresponding to the data identifier to particular collector modules. For example, the collector module 502A may update the data identifier to indicate a first portion of the data is assigned to the collector module 502A for ingest, a second portion of the data is assigned to the collector module 502B for ingest, etc.

At (5), the collector module 502A ingests a first portion of the data (e.g., a first block of data) from the data source 510. For example, the collector module 502A may ingest a first portion of the data for ingest assigned to the collector module 502A. In some cases, prior to ingesting the first portion of the data, the collector module 502A may obtain the data identifier from the data store 527 (e.g., as stored by the collector module 502A). In some cases, the collector module 502A may ingest and process the first portion of the data.

At (6), the collector module 502A provides an update (e.g., indicating that ingest of the first portion of the data is complete) to the communication buffer 520. The collector module 502A may provide the update in response to determining the ingest is completed. In some cases, the collector module 502A may update the data identifier to indicate that the ingest of the first portion of the data is complete.

At (7), the coordinator module 506A provides second collector instructions to the collector module 502B. The coordinator module 506A may determine that the assignment data indicates that the collector module 502B is assigned to ingest data from the data source 510 based on the data identifier and may generate second collector instructions that instruct the collector module 502B to ingest the data. In some cases, the coordinator module 506A may generate the second collector instructions based on the update provided by the collector module 502A (e.g., indicating that ingest of the first portion of the data is complete).

At (8), the collector module 502B obtains the data identifier from the data store 527. The collector module 502B may obtain the data identifier based on the second collector instructions (e.g., indicating to ingest data according to the data identifier). The collector module 502B may identify a portion of the data assigned to the collector module 502B (e.g., by a scheduler module, by the collector module 502A, etc.) within the data identifier. In some cases, the collector module 502B may obtain the update provided by the collector module 502A (e.g., Indicating that ingest of the first portion of the data is complete) and may identify a portion of the data assigned to the collector module 502B based on the update. In some cases, the update provided by the collector module 502A may cause an update to the data identifier and the collector module 502B may obtain the updated data identifier from the data store 527.

In some cases, the collector module 502B (or a separate component such as the coordinator module 506A) may update the data identifier to indicate the collector module 502B has obtained the data identifier and/or has initiated the ingest of the portion of data. For example, the collector module 502B may update the data identifier to indicate the collector module 502B has initiated ingest of the portion of the data assigned to the collector module 502A for ingest.

At (9), the collector module 502B ingests a second portion of the data (e.g., a second block of data) from the data source 510. For example, the collector module 502B may ingest a second portion of the data for ingest assigned to the collector module 502B. In some cases, the collector module 502B may ingest and process the second portion of the data.

At (10), the collector module 502B provides an update (e.g., indicating that ingest of the second portion of the data is complete) to the communication buffer 520. The collector module 502B may provide the update in response to determining the ingest is completed. In some cases, the collector module 502B may update the data identifier to indicate that the ingest of the second portion of the data is complete.

Fewer, more, or different steps may be included in the data flow diagram. For example, any one or any step described herein with FIG. 9 may be used with any one or any combination of steps described herein with reference to FIG. 7 and/or FIG. 8.

2.3. Dynamic Assignment of Collector Modules to Isolated Execution Environments As described herein, the host computing device 503 can ingest data utilizing isolated execution environments 501 that are dynamically assigned to and instantiated on the host computing device 503 and collector modules 502 that are dynamically assigned to and instantiated on the isolated execution environments 501.

The techniques described herein can enable an isolated execution environment 501 to ingest multi-tenanted data. For example, the isolated execution environment 501 can ingest first data associated with a first tenant using a first connector and second data associated with a second tenant using a second connector.

In some cases, systems may be unable to dynamically assign isolated execution environments and/or collector modules. This can cause inefficiencies as the system may not be able to adjust the isolated execution environments and/or the collector modules in response to a workload.

Turning to FIG. 10, an illustrative algorithm or routine 1000 will be described for a data ingestion process. The routine 1000 may be implemented, for example, by the host computing device 503 described herein with reference to FIG. 5. The routine 1000 begins at block 1002, where the host computing device 503 determines, by and/or using an application interface 504 of an isolated execution environment 501 of the host computing device 503, configuration data 522 (e.g., based on instructions from a user computing device). For example, the isolated execution environment 501 may be a first isolated execution environment of a plurality of isolated execution environments (e.g., a plurality of data collection nodes). All or a portion of the isolated execution environments of the plurality of isolated execution environments may include a plurality of collector modules (e.g., a plurality of collector modules), a coordinator module, a scheduler module, and/or an application interface instantiated on the respective isolated execution environment.

The plurality of isolated execution environments may share compute resources of the host computing device 503. For example, the plurality of isolated execution environments may share a processor, memory, etc. of the host computing device 503.

A second isolated execution environment of the plurality of isolated execution environments may include a second plurality of collector modules, a second coordinator module, and/or a second scheduler module. The second coordinator module may monitor execution of the second plurality of collector modules within the second isolated execution environment. The second scheduler module may be disabled based on the designation of the scheduler module 508A as the active scheduler module.

The host computing device 503 may be in communication with a communication buffer 520. For example, the communication buffer 520 may be communicatively coupled with the plurality of isolated execution environments. The communication buffer 520 may include configuration data 522, assignment data 524 (e.g., connector-isolated execution environment assignments), and/or status data 526 (e.g., a status of collector modules of a plurality of connectors).

The configuration data 522 may indicate configurations for a plurality of connectors. For example, the configuration data 522 may include identifier of one or more connectors, a number of collector modules, a collector module status, a connector status, etc. All or a portion of the plurality of connectors may include a cluster of collector modules. All or a portion of the plurality of connectors may include collector modules that ingest (e.g., collect) data from a same data source. For example, a first connector may include collector modules to ingest data from a first data source, a second connector may include collector modules to ingest data from a second data source, etc.

The configuration data 522 may be editable by all or a portion of a plurality of application interfaces (e.g., the application interface 504) of the plurality of isolated execution environments. The active scheduler module 508A of the isolated execution environment 501 may obtain the configuration data 522 and determine a number of collector modules based on the configuration data 522. In some cases, the active scheduler module 508A may define a connector (e.g., a cluster of collector modules) based on the number of collector modules. The active scheduler module 508A may assign collector modules to the plurality of isolated execution environments and update the assignment data 524 based on the configuration data 522 to obtain updated assignment data. In some cases, the active scheduler module 508A may assign multiple collector modules or no collector modules to a particular isolated execution environment.

The assignment data 524 may be editable by the active scheduler module 508A. The active scheduler module 508A may read the configuration data 522 and/or the status data 526 and may modify the assignment data 524 based on the configuration data 522 and/or the status data 526 and based on the scheduler module 508A being designated as the active scheduler module. In some cases, standby scheduler modules may not edit the assignment data 524.

As discussed herein, the active scheduler module 508A may modify and/or update the assignment data 524 and obtain modified assignment data (e.g., modified and/or updated connector-isolated execution environment assignments). In one example, to modify the assignment data 524, the active scheduler module 508A may modify an assignment of a collector module (e.g., a third collector module) from the isolated execution environment 501 to an assignment of the collector module to a second isolated execution environment of the plurality of isolated execution environments (e.g., to obtain a modified assignment of the collector module). The coordinator module 506 may read the modified assignment data and terminate the collector module on the isolated execution environment 501 based on the modified assignment of the collector module. A second coordinator module (e.g., of the second isolated execution environment, of the plurality of coordinator modules, etc.) may read the modified assignment data and/or the status data 526 and generate the collector module on the second isolated execution environment based on the modified assignment of the collector module and/or the status data 526. In some cases, the second coordinator module may determine the status data 526 indicates reassignment of the collector module is available based on termination of the collector module on the isolated execution environment 501 and may generate the collector module based on determining the status data 526 indicates reassignment is available.

In another example, the active scheduler module 508A may update the assignment data 524 to indicate assignment of a collector module (e.g., a third collector module) to the isolated execution environment 501 and/or a collector module (e.g., a fourth collector module) to the second isolated execution environment. The coordinator module 506 may read the updated assignment data, generate the third collector module on the isolated execution environment 501, and update the status data 526. The second coordinator module may read the updated assignment data, generate the fourth collector module on the second isolated execution environment, and update the status data 526.

The status data 526 may be editable by all or a portion of a plurality of coordinator modules of the plurality of isolated execution environments. The active scheduler module 508A may read the status data 526 from the communication buffer 520. In some cases, all or a portion of the scheduler modules of the plurality of isolated execution environments may read the status data 526 from the communication buffer 520.

At block 1004, the host computing device 503 assigns, by and/or using the scheduler module 508A (e.g., the active scheduler module 508A), a cluster of collector modules (corresponding to a particular connector of the plurality of connectors) between a plurality of isolated execution environments. For example, the active scheduler module 508A may be a first scheduler module. To assign the cluster of collector modules between the plurality of isolated execution environments, the active scheduler module 508A may assign one or more collector modules of the cluster to a first isolated execution environment, one or more collector modules of the cluster to a second isolated execution environment, etc. For example, the active scheduler module 508A may assign the plurality of collector modules 502 for generation across a plurality of isolated execution environments. In response, a first isolated execution environment may spin up a first collector module, a second isolated execution environment may spin up a second collector module, etc.

In some cases, the active scheduler module 508A may reassign the plurality of collector modules 502 across the plurality of isolated execution environments based on changes to the plurality of isolated execution environments (e.g., a spin up of an isolated execution environment and addition to the plurality of isolated execution environments or spin down of an isolated execution environment and removal from the plurality of isolated execution environments). In some cases, the active scheduler module 508A may assign (or reassign) the plurality of collector modules 502 across the plurality of isolated execution environments based on a determined load of the plurality of collector modules and/or the plurality of isolated execution environments.

At block 1006, the host computing device 503 collects, by and/or using a first collector module 502 of the plurality of collector modules 502, data from a first data source 510A (e.g., portions of data from a single data source). For example, the first data source 510A may be a data source of a first tenant. A first connector of the plurality of connectors may correspond to (e.g., may include) the first collector module 502.

In some cases, multiple collector modules corresponding to the same connector may be instantiated on the same isolated execution environment. For example, a third collector module 502 of the plurality of collector modules 502 instantiated on the isolated execution environment 501 may correspond to the first connector and may collect data from the first data source 510A.

In some cases, collector modules corresponding to the same connector may be instantiated on different isolated execution environments. For example, at least one collector module of the second plurality of collector modules instantiated on the second isolated execution environment may correspond to the first connector.

At block 1008, the host computing device 503 collects, by and/or using a second collector module 502 the plurality of collector modules 502, data from a second data source 510B (e.g., portions of data from a single data source). For example, the second data source 510B may be a data source of a second tenant. A second connector of the plurality of connectors may correspond to the second collector module 502.

At block 1010, the host computing device 503 monitors, by and/or using a coordinator module 506 of the isolated execution environment 501, execution of the plurality of collector modules. For example, the coordinator module 506 may be a first coordinator module.

Fewer, more, or different blocks may be included in the routine 1000. For example, any one or any combination of the blocks described herein with reference to FIGS. 11, 12, and 13 may be used in combination with any one or any combination of the blocks of routine 1000.

2.4. Scheduling and Utilizing Collector Modules

As described herein, the host computing device 503 can ingest data utilizing collector modules 502 that are dynamically assigned to isolated execution environments 501. For example, the assignment of collector modules 502 to isolated execution environments 501 may be variable.

The techniques described herein can enable assignment of a scheduler module 508A (e.g., assigned as an active scheduler module 508A) to assign (e.g., distribute) the collector modules 502. The active scheduler module 508A can assign the collector modules 502 between the isolated execution environments 501 and can define one or more connectors.

In some cases, systems may be unable to dynamically assign collector modules to isolated execution environments. This can cause inefficiencies as the system may not be able to adjust a previous assignment in response to an input from a client device.

Figure 11:
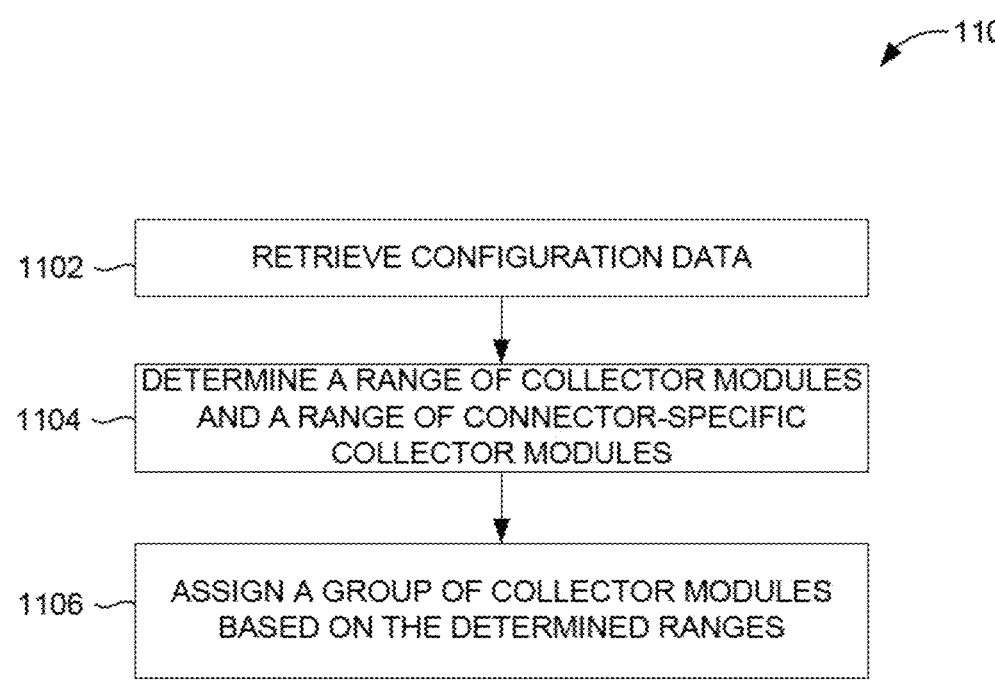
FIG. 11 is a flow diagram illustrative of an example of a routine, implemented by a host computing device, for utilizing and scheduling collector modules based on configuration data.

Turning to FIG. 11, an illustrative algorithm or routine 1100 will be described for a data ingestion process. The routine 1100 may be implemented, for example, by the host computing device 503 described herein with reference to FIG. 5.

At block 1102, the host computing device 503 retrieves, by and/or using an active scheduler module 508A of an isolated execution environment 501 of the host computing device 503, configuration data 522 (e.g., collector configuration data). For example, the isolated execution environment 501 may be a first isolated execution environment of a plurality of isolated execution environments instantiated on and/or may share compute resources of the host computing device 503.

The configuration data 522 may be configuration data for a plurality of connectors. For example, the configuration data 552 may include an identifier of one or more connectors, a number of collector modules, a collector module status, a connector status, etc. All or apportion of the plurality of connectors may include one or more collector modules to obtain data from a same data source.

The active scheduler module 508A may retrieve the configuration data 522 from a communication buffer 520. The communication buffer 520 may be instantiated on the host computing device 503. The communication buffer 520 may be communicatively coupled with the plurality of isolated execution environments and may store the configuration data 522, assignment data 524, and/or status data 526. The status data 526 may be editable by a plurality of coordinator modules of the plurality of isolated execution environments. In some cases, all or a portion of the plurality of isolated execution environments (e.g., coordinator modules of the plurality of isolated execution environments) may update the status data 526 based on generation or termination of a collector module by a respective isolated execution environment.

In some cases, the host computing device 503 (e.g., the plurality of isolated execution environments) may assign the scheduler module 508A as the active scheduler module to retrieve the configuration data 522 from a plurality of scheduler modules of the plurality of isolated execution environments. The plurality of scheduler modules of the plurality of isolated execution environments may include the active scheduler module and a plurality of standby scheduler modules. Based on the assignment of the scheduler module 508A as the active scheduler module, the scheduler module 508A may enabled to edit the assignment data 524 (e.g., indicating the connector-isolated execution environment assignments). The standby scheduler modules may not execute.

The plurality of connectors may be assigned to retrieve data from a plurality of data sources. All or a portion of the plurality of connectors may include a respective plurality of collector modules (e.g., distributable collector modules).

At block 1104, the host computing device 503 determines, by and/or using the active scheduler module 508A, a range of collector modules (e.g., a range of collector modules for all or a portion of the plurality of isolated execution environments) and a range of connector-specific collector modules (e.g., a range of collector modules for a particular connector). For example, the range of collector modules may indicate a range of collector modules for generation by a particular isolated execution environment (e.g., between 2-4) and the range of collector modules may indicate a range of collector modules for a particular connector on a particular isolated execution environment (e.g., between 1-2). The host computing device 503 may determine the range of collector modules and the range of connector-specific collector modules based on the configuration data (e.g., indicating a number of collector modules, a number of isolated execution environments generated on the host computing device, a level of parallelism, etc.).

In some cases, the active scheduler module 508A may determine the range of collector modules for all or a portion of the isolated execution environments and/or the range of connector-specific collector modules for all or a portion of the connectors and/or the isolated execution environments. In some cases, the active scheduler module 508A may determine different ranges of collector modules for all or a portion of the isolated execution environments and/or different ranges of connector-specific collector modules for all or a portion of the connectors and/or the isolated execution environments. The active scheduler module 508A may determine the range of collector modules and the range of connector-specific collector modules to obtain a determined range of collector modules and a determined range of connector-specific collector modules.

At block 1106, the host computing device 503 assigns, by and/or using the active scheduler module 508A, a group of collector modules (e.g., distributable collector modules) based on the determined ranges. In some cases, the active scheduler module 508A may assign the group of collector modules based on the configuration data 522, a utilization associated with the plurality of isolated execution environments, etc. In some cases, the active scheduler module 508A may generate, modify, and/or update the assignment data 524 to obtain generated, modified, and/or updated assignment data based on assigning the group of collector modules and may store the generated, modified, and/or updated assignment data in the communication buffer 520.

The active scheduler module 508A may assign a respective group of collector modules to all or a portion of the plurality of isolated execution environments based on the determined ranges. The active scheduler module 508A may assign a first collector module (e.g., a first distributable collector module) of a first connector of the plurality of connectors to the isolated execution environment 501 (e.g., a first isolated execution environment) and a first collector module of a second connector of the plurality of connectors to the isolated execution environment 501. In some cases, the active scheduler module 508A may assign at least one of the plurality of isolated execution environments to generate at least two collector modules of the same connector. For example, the active scheduler module 508A may assign a second collector module (e.g., a second distributable collector module) of the first connector to the first isolated execution environment.

All or a portion of the plurality of isolated execution environments may retrieve at least a portion of the assignment data 524 from the communication buffer 520, generate (and/or terminate) one or more collector modules based on the assignment data 524, and ingest at least a portion of data.

Fewer, more, or different blocks may be included in the routine 1100. For example, any one or any combination of the blocks described herein with reference to FIGS. 10, 12, and 13 may be used in combination with any one or any combination of the blocks of routine 1100.

2.5. Coordinating Collector Modules

As described herein, the host computing device 503 can ingest data utilizing collector modules 502 that are dynamically assigned to isolated execution environments 501. For example, the host computing device 503 can coordinate the collector modules 502 to ingest the data.

The techniques described herein can enable the host computing device 503 to coordinate the collector modules 502 to ingest the data based on a type of data source 510 associated with the data. The host computing device 503 can determine whether the data source 510 supports parallel reads and coordinate the collector modules 502 to ingest the data based on whether the data source 510 supports parallel reads.

In some cases, systems may be unable to adjust how data is ingested based on whether a data source supports parallel reads. This can cause inefficiencies as the system may not be able to ingest data using multiple collector modules from some data sources.

Figure 12:
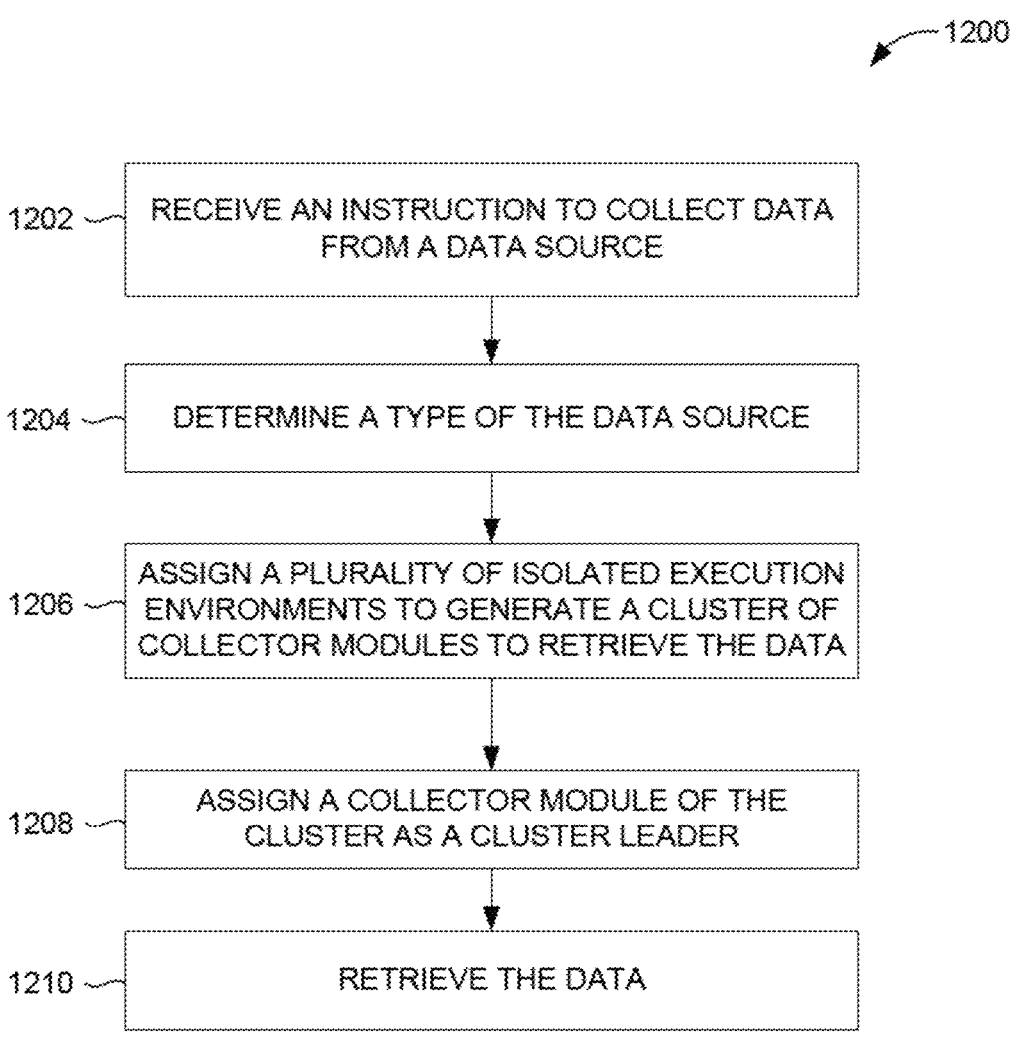
FIG. 12 is a flow diagram illustrative of an example of a routine, implemented by a host computing device, for coordinating isolated execution environments to obtain data from a data source.

Turning to FIG. 12, an illustrative algorithm or routine 1200 will be described for a data ingestion process. The routine 1200 may be implemented, for example, by the host computing device 503 described herein with reference to FIG. 5. The routine begins at block 1202, where the host computing device 503 receives, by and/or using an application interface 504 of an isolated execution environment 501 of the host computing device 503, an instruction to collect data from a data source 510 (e.g., a first data source). The application interface 504 may receive the instruction from client device 503

In some cases, a scheduler module 508A (e.g., designated as the active scheduler module 508A) of the isolated execution environment 501 may retrieve configuration data 522 from a communication buffer 520. The configuration data 522 may indicate a type of the data source 510, an identifier of a connector corresponding to a cluster of collector modules, a number of collector modules to be instantiated for the cluster of collector modules, etc.

At block 1204, the host computing device 503 determines, by and/or using the active scheduler module 508A of the isolated execution environment 501, a type of the data source 510. The cluster of collector modules (or the active scheduler module 508A) may determine that the type of the data source 510 is a first type (e.g., indicating that the data source 510 does not support parallel reads) or a second type (e.g., indicating that the data source 510 supports parallel reads). For example, the cluster of collector modules may determine the type of the data source 510 is the first type based on a determination that the data source 510 is not configured for parallel reads. In some cases, the cluster of collector modules may determine the type of the data source 510 based on the configuration data 522.

Based on a determination that the type of the data source 510 is the first type (e.g., the data source 510 does not support parallel reads), at block 1206, the host computing device 503 assigns, by and/or using the active scheduler module 508A, a plurality of isolated execution environments to generate a cluster of collector modules (e.g., a first cluster of collector modules) to retrieve the data. For example, the active scheduler module 508A can assign the plurality of isolated execution environments to generate the cluster of collector modules to collect data from the data source 510. The plurality of isolated execution environments may be instantiated on and/or may share compute resources of the host computing device 503.

All or a portion of the plurality of isolated execution environments may generate at least one collector module of the cluster of collector modules and configure the at least one collector module to collect data from the data source 510. In some cases, the active scheduler module 508A may assign at least one of the plurality of isolated execution environments to generate at least two collector modules of the cluster of collector modules.

At block 1208, the host computing device 503 assigns, by and/or using the cluster of collector modules, a collector module 502 of the cluster (e.g., a first collector module) as a cluster leader. In some cases, the active scheduler module 508A may identify the collector module 502 as the cluster leader based on a leader election process conducted by the cluster of collector modules (e.g., the cluster of collector modules may self-identify a cluster leader). In some cases, the cluster of collector modules may select the collector module 502 as the cluster leader from the cluster of collector modules (e.g., based on an availability, a workload, etc. of the cluster of collector modules).

The cluster leader may obtain a data identifier of data (e.g., an identification of a plurality of blocks of data, an identification of data locations of the data, etc.) to be collected by the cluster of collector modules. The cluster leader may communicate the data identifier to a data store 527.

The cluster of collector modules may retrieve the data identifier from the data store 527 to obtain a retrieved data identifier. In some cases, all or a portion of the cluster of collector modules may monitor the data store 527 to obtain the data identifier.

At block 1210, the host computing device 503 retrieves, by and/or using the cluster of collector modules, the data (e.g., the plurality of blocks of data). For example, the cluster of collector modules can retrieve the data from the data source 510. All or a portion of the cluster of collector modules (including the cluster leader) may retrieve the data based on the retrieved data identifier. For example, all or a portion of the cluster of collector modules may request, using the retrieved data identifier, data from the data source 510 (e.g., a block of data) and may process the data. In some cases, all or a portion of the cluster of collector modules may provide an update to the communication buffer 520 indicating the processing of the data.

Fewer, more, or different blocks may be included in the routine 1200. For example, any one or any combination of the blocks described herein with reference to FIGS. 10, 11, and 13 may be used in combination with any one or any combination of the blocks of routine 1200.

As a non-limiting example, if the cluster of collector modules determines that the data source 510 is a second type (e.g., a type of data source that supports parallel reads), the active scheduler module 508A may not identify a collector module to be a cluster leader (e.g., based on assignment by the cluster of collector modules of a cluster leader). Instead, the active scheduler module 508A may assign all or a portion of a plurality of collector modules to retrieve the data from the data source 510 (e.g., in parallel). In some such cases, the data source may provide coordination for the cluster of collector modules.

In some cases, the application interface 504 (or a different application interface) may receive an instruction to collect data from a second data source. If, the system determines that the data source 510 supports parallel reads, the system may not identify one of the collector modules as the cluster leader. If the system determines that the second data source is not configured for parallel reads, the system may perform routine 1200 with respect to the second data source In any case, the system may instantiate two connectors using the same (or overlapping) isolated execution environments to collect data from different data sources. As described herein, the data sources may correspond to different tenants. As such an isolated execution environment may collect data from multiple data sources corresponding to different tenants.

Moreover, one or more of the isolated execution environments may include at least one collector module corresponding to the first data source and at least one collector module corresponding to the second data source. As such, an isolated execution environment may be configured to collect data from multiple data sources (and/or tenants) using different collection modules instantiated thereon.

In certain cases, all or a portion of the plurality of isolated execution environments may generate and/or execute a respective plurality of collector modules corresponding to a respective plurality of connectors. For example, a first isolated execution environment may generate and/or execute a first plurality of collector modules corresponding to a first connector and a second connector, a second isolated execution environment may execute a second plurality of collector modules corresponding to the second connector In some cases, all or a portion of the plurality of isolated execution environments may generate and/or execute collector modules corresponding to different clusters of collector modules. For example, a first isolated execution environment a first isolated execution environment of the plurality of isolated execution environments may generate at least one collector module of the cluster of collector modules, configure the at least one collector module of the first cluster of collector modules to collect data from the first data source, generate at least one collector module of a second cluster of collector modules, and configure the at least one collector module of the second cluster of collector modules to collect data from a second data source.

2.6. Transitioning Collector Modules

As described herein, the isolated execution environments 501 can generate and/or terminate collector modules 502 based on collector modules assigned to the isolated execution environments 501. For example, an isolated execution environment can generate a first collector module and terminate a second collector module based on the assignment.

The techniques described herein can enable the host computing device 503 to coordinate the collector modules 502. The host computing device 503 can transition collector modules 502 between isolated execution environments 501 using an active scheduler module of an isolated execution environment.

In some cases, systems may be unable to transition collector modules between isolated execution environments. This can cause inefficiencies as the system may not be able to adjust the collector modules assigned to the isolated execution environments in response to variable workloads.

Turning to FIG. 13, an illustrative algorithm or routine 1300 will be described for a data ingestion process. The routine 1300 may be implemented, for example, by the host computing device 503 described herein with reference to FIG. 5. The routine begins at block 1302, where the host computing device 503 receives, by and/or using an application interface 504 of a first isolated execution environment 501A of the host computing device 503, an instruction (e.g., a first instruction) to modify at least one collector module. For example, the instruction may be an instruction to modify a connector (e.g., a cluster of collector modules).

The instruction may be an instruction to modify at least one collector module of the cluster of collector modules. For example, the instruction may be an instruction to remove at least one collector module from the cluster of collector modules, add at least one collector module to the cluster of collector modules, move at least one collector module of the cluster of collector modules between isolated execution environments, etc.

The cluster of collector modules (e.g., a first cluster of collector modules) may be instantiated on a plurality of isolated execution environments that includes the first isolated execution environment 501A. The plurality of isolated execution environments may be instantiated and/or may share compute resources of the host computing device 503. The cluster of collector modules may collect data from a data source 510 (e.g., a first data source).

At block 1304, the host computing device 503 determines, by and/or using a scheduler module 508A (e.g., an active scheduler module 508A) of the first isolated execution environment 501A, to modify a first collector module 502 (e.g., of the cluster of collector modules). For example, modifying a first collector module 502 may include terminating the first collector module 502 on an isolated execution environment, generating the first collector module 502 on an isolated execution environment, moving (e.g., transitioning) the first collector module 502 between isolated execution environments (e.g., terminating the first collector module 502 on a first isolated execution environment and generating the first collector module 502 on a second isolated execution environment), etc. The active scheduler module 508A may determine to modify the first collector module 502 based on the configuration data 522, the assignment data 524, and/or the status data 526. In some cases, the active scheduler module 508A may retrieve, based on the instruction, configuration data 522, assignment data 524, and/or status data 526 from a communication buffer 520 coupled with the plurality of isolated execution environments. In some cases, the host computing device 503 (e.g., the application interface 504) can generate and store the configuration data 522 in the communication buffer 520.

The configuration data 522 may indicate at least one of an identifier of a connector corresponding to the cluster of collector modules, a number of collector modules to be instantiated for the cluster of collector modules, or a status of the connector. The assignment data 524 may indicate connector-isolated execution environment assignments. The status data 526 may indicate a status of collector modules.

The status data 526 may be editable by a plurality of coordinator modules of the plurality of isolated execution environments. The assignment data 524 may be editable by the scheduler module 508A (e.g., based on designation of the scheduler module 508A as the active scheduler module).

The active scheduler module 508A may determine a range of collector modules and a range of connector-specific collector modules based on the configuration data 522, assignment data 524, and/or status data 526 to obtain a determined range of collector modules and a determined range of connector-specific collector modules. The active scheduler module 508A may determine to modify the first collector module 502 based on the determined range of collector modules and/or the determined range of connector-specific collector modules. In some cases, the active scheduler module 508A may determine updated assignment data based on the determined range of collector modules and/or the determined range of connector-specific collector modules, identify the first collector module 502, and determine to modify the first collector module 502 based on the updated assignment data.

In one example, at block 1302, the host computing device 503 may receive instructions to modify at least one collector module (e.g., to terminate three collector modules, generate two collector modules, rebalance the collector modules, etc.), and at block 1304, the host computing device 503 may determine a particular collector module (e.g., the first collector module 502) to modify based on determining to modify at least one collector module. In another example, at block 1302, the host computing device 503 may receive instructions to modify a particular connector (e.g., increase or decrease a number of collector modules of a connector, a parallelism of the connector, etc.), and at block 1304, the host computing device 503 may determine one or more isolated execution environments of the plurality of isolated execution environments to generate a collector module, terminate a collector module, transition a collector module from, transition a collector module to, etc. based on the determined modification.

The host computing device 503 may determine one or more isolated execution environments of the plurality of isolated execution environments to generate a collector module, terminate a collector module, transition a collector module from, transition a collector module to, etc. based on the collector modules generated on all or a portion of the plurality of isolated execution environments. For example, the host computing device 503 may identify an isolated execution environment that has generated the fewest number of collector modules as compared to other isolated execution environments and/or that has a number of collector modules that does not satisfy the determined ranges and determine the isolated execution environment to generate a collector module based on identifying the isolated execution environment and the determined modification (e.g., indicating generation of at least one collector module). In another example, the host computing device 503 may identify an isolated execution environment that has generated a greatest number of collector modules as compared to other isolated execution environments and/or that has a number of collector modules that does not satisfy the determined ranges and determine the isolated execution environment to terminate a collector module based on identifying the isolated execution environment and the determined modification (e.g., indicating termination of at least one collector module).

At block 1306, the host computing device 503, by and/or using the active scheduler module 508A, identifies a second isolated execution environment 501B on which the first collector module 502 is executing. The second isolated execution environment 501B may include a plurality of collector modules. The plurality of collector modules may include a collector module of the cluster of collector modules (e.g., a second collector module) and a collector module of a second cluster of collector modules (e.g., a third collector module). The second cluster of collector modules may collect data from a data source (e.g., a second data source).

In some cases, the first isolated execution environment 501A may include the second isolated execution environment 501B. For example, the first isolated execution environment 501A and the second isolated execution environment 501B may be the same isolated execution environment.

At block 1308, the host computing device 503 communicates, by and/or using the active scheduler module 508A, an instruction (e.g., a second instruction). The active scheduler module 508A may communicate the instruction to the communication buffer 520. The instruction may include an instruction for the second isolated execution environment 501B to terminate the first collector module 502 and an instruction for a third isolated execution environment to generate the first collector module 502.

The third isolated execution environment may include a plurality of collector modules. The plurality of collector modules may include a collector module of the cluster of collector modules (e.g., a second collector module) and a collector module of a second cluster of collector modules (e.g., a third collector module). The second cluster of collector modules may collect data from a data source (e.g., a second data source).

At block 1310, the host computing device 503 retrieves, by and/or using a coordinator module 506B of the second isolated execution environment 501B, the instruction (e.g., from the communication buffer 520). In some cases, the coordinator module 506B may retrieve at least a first portion of the instruction corresponding to instructions for the second isolated execution environment 501B.

At block 1312, the host computing device 503 terminates, by and/or using the second isolated execution environment 501B, the first collector module (e.g., on the second isolated execution environment 501B).

At block 1314, the host computing device 503 updates, by and/or using the coordinator module 506B, a communication buffer 520. For example, the coordinator module 506B may update the communication buffer 520 to indicate that the first collector module 502 is terminated, to unlock control of the first collector module 502, etc.

At block 1316, the host computing device 503 retrieves, by and/or using a coordinator module of a third isolated execution environment, the instruction and an indication that the first collector module 502 is terminated (e.g., from the communication buffer 520). In some cases, the coordinator module of the third isolated execution environment may retrieve at least a second portion of the instruction corresponding to instructions for the third isolated execution environment.

At block 1318, the host computing device 503 generates, by and/or using the coordinator module of the third isolated execution environment, the first collector module 502 (e.g., on the third isolated execution environment). For example, the host computing device 503 may generate the first collector module 502 based on updated configuration data 522 from the communication buffer 520. The coordinator module of the third isolated execution environment may generate the first collector module 502 based on the instruction (e.g., the second portion of the instruction) and the indication that the first collector module 502 is terminated on the second isolated execution environment 501B.

In some cases, the coordinator module of the third isolated execution environment can update the communication buffer 520 to indicate that the first collector module 502 is generated (e.g., on the third isolated execution environment), to lock control of the first collector module 502, etc. based on generating the first collector module 502 on the third isolated execution environment.

Fewer, more, or different blocks may be included in the routine 1300. For example, any one or any combination of the blocks described herein with reference to FIGS. 10, 11, and 12 may be used in combination with any one or any combination of the blocks of routine 1300.

3.0. Hardware Embodiment

Figure 14:
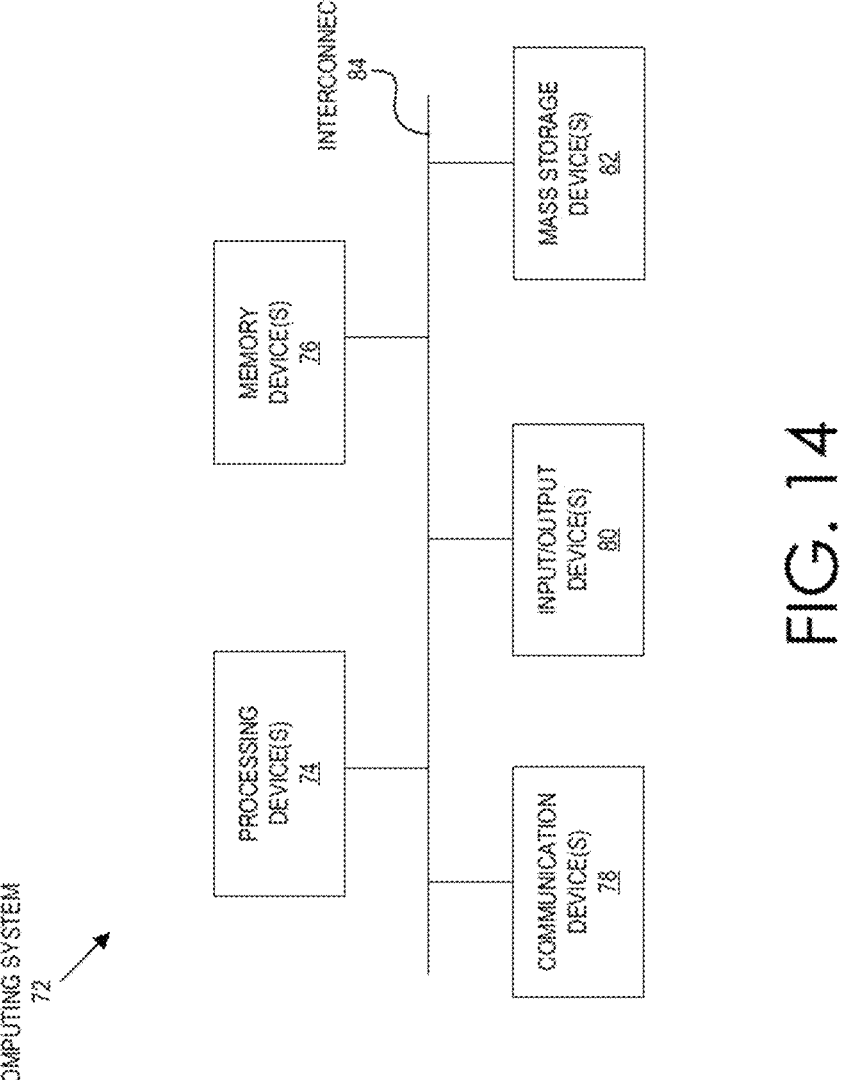
FIG. 14 is a block diagram illustrating a high-level example of a hardware architecture of a computing system in which an embodiment may be implemented.

FIG. 14 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, server computer system, edge device, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described herein.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs.

4.0. Example Embodiments

Clause 1: A host computing device, comprising:
a plurality of isolated execution environments configured as data collection nodes, wherein a first isolated execution environment of the plurality of isolated execution environments comprises:
  a first application interface configured to determine configurations for a plurality of connectors, each connector of the plurality of connectors comprising a cluster of collector modules configured to collect data from a same data source,
  a first plurality of collector modules, wherein a first collector module of the first plurality of collector modules is configured to collect data from a first data source of a first tenant and a second collector module of the first plurality of collector modules is configured to collect data from a first data source of a second tenant, wherein the first collector module corresponds to a first connector of the plurality of connectors and the second collector module corresponds to a second connector of the plurality of connectors,
  a first coordinator module configured to monitor execution of the first plurality of collector modules within the first isolated execution environment, and
  a first scheduler module configured to assign the cluster of collector modules of the first connector between the plurality of isolated execution environments; and
a communication buffer communicatively coupled with the plurality of isolated execution environments, the communication buffer comprising:
  configuration data indicating the configurations for the plurality of connectors, wherein the configuration data is editable by a plurality of application interfaces of the plurality of isolated execution environments, assignment data indicating assignment of the cluster of collector modules of the first connector between the plurality of isolated execution environments, wherein the assignment data is editable by the first scheduler module, and status data indicating a status of collector modules of the plurality of connectors, wherein the status data is editable by a plurality of coordinator modules of the plurality of isolated execution environments.

Clause 2: The host computing device of Clause 1, wherein the plurality of isolated execution environments share compute resources of the host computing device.

Clause 3: The host computing device of any one of Clause 1 or Clause 2, wherein a third collector module of the first plurality of collector modules corresponds to the first connector and is configured to collect data from the first data source of the first tenant.

Clause 4: The host computing device of any one of Clauses 1 through 3, wherein a second isolated execution environment of the plurality of isolated execution environments comprises:

a second plurality of collector modules, wherein at least one collector module of the second plurality of collector modules corresponds to the first connector.

Clause 5: The host computing device of any one of Clauses 1 through 4, wherein a second isolated execution environment of the plurality of isolated execution environments comprises:

a second plurality of collector modules, wherein at least one collector module of the second plurality of collector modules corresponds to the first connector, and a second coordinator module of the plurality of coordinator modules, the second coordinator module configured to monitor execution of the second plurality of collector modules within the second isolated execution environment.

Clause 6: The host computing device of any one of Clauses 1 through 5, wherein a second isolated execution environment of the plurality of isolated execution environments comprises:

a second plurality of collector modules, wherein at least one collector module of the second plurality of collector modules corresponds to the first connector, a second coordinator module of the plurality of coordinator modules, the second coordinator module configured to monitor execution of the second plurality of collector modules within the second isolated execution environment, and a second scheduler module, wherein the second scheduler module is disabled.

Clause 7: The host computing device of any one of Clauses 1 through 6, wherein the first scheduler module is configured to read the status data from the communication buffer.

Clause 8: The host computing device of any one of Clauses 1 through 7, wherein the first scheduler module is configured to read the status data from the communication buffer and modify the assignment data based on the status data.

Clause 9: The host computing device of any one of Clauses 1 through 8, wherein the first scheduler module is configured to read the status data from the communication buffer and modify the assignment data based on the status data, wherein to modify the assignment data, the first scheduler module is configured to modify an assignment of a third collector module from the first isolated execution environment to an assignment of the third collector module to a second isolated execution environment of the plurality of isolated execution environments.

Clause 10: The host computing device of any one of Clauses 1 through 9, wherein the first scheduler module is configured to read the status data from the communication buffer and modify the assignment data based on the status data to obtain modified assignment data, wherein to modify the assignment data, the first scheduler module is configured to modify an assignment of a third collector module from the first isolated execution environment to a second isolated execution environment of the plurality of isolated execution environments to obtain a modified assignment of the third collector module, and wherein the first coordinator module is configured to read the modified assignment data and terminate the third collector module on the first isolated execution environment based on the modified assignment of the third collector module.

Clause 11: The host computing device of any one of Clauses 1 through 10, wherein the first scheduler module is configured to read the status data from the communication buffer and modify the assignment data based on the status data to obtain modified assignment data, wherein to modify the assignment data, the first scheduler module is configured to modify an assignment of a third collector module from the first isolated execution environment to a second isolated execution environment of the plurality of isolated execution environments to obtain a modified assignment of the third collector module, wherein the first coordinator module is configured to read the modified assignment data and terminate the third collector module on the first isolated execution environment based on the modified assignment of the third collector module, and wherein a second coordinator module of the plurality of coordinator modules is configured to read the modified assignment data and generate the third collector module on a second isolated execution environment based on the modified assignment of the third collector module, wherein the second coordinator module is configured to monitor execution of a second plurality of collector modules within the second isolated execution environment.

Clause 12: The host computing device of any one of Clauses 1 through 11, wherein the first scheduler module is configured to read the status data from the communication buffer and modify the assignment data based on the status data to obtain modified assignment data, wherein to modify the assignment data, the first scheduler module is configured to modify an assignment of a third collector module from the first isolated execution environment to a second isolated execution environment of the plurality of isolated execution environments to obtain a modified assignment of the third collector module, wherein the first coordinator module is configured to read the modified assignment data and terminate the third collector module on the first isolated execution environment based on the modified assignment of the third collector module, and wherein a second coordinator module of the plurality of coordinator modules is configured to read the modified assignment data and the status data, determine the status data indicates reassignment of the third collector module is available based on termination of the third collector module on the first isolated execution environment, and generate the third collector module on a second isolated execution environment based on the modified assignment of the third collector module, wherein the second coordinator module is configured to monitor execution of a second plurality of collector modules within the second isolated execution environment.

Clause 13: The host computing device of any one of Clauses 1 through 12, wherein the first application interface is further configured to update the configuration data.

Clause 14: The host computing device of any one of Clauses 1 through 13, wherein the first scheduler module is further configured to obtain the configuration data and determine a number of collector modules based on the configuration data.

Clause 15: The host computing device of any one of Clauses 1 through 14, wherein the first scheduler module is further configured to obtain the configuration data and determine a number of collector modules based on the configuration data, wherein the first scheduler module is configured to define the cluster of collector modules based on the number of collector modules.

Clause 16: The host computing device of any one of Clauses 1 through 15, wherein the first scheduler module is further configured to obtain the configuration data and update the assignment data based on the configuration data.

Clause 17: The host computing device of any one of Clauses 1 through 16, wherein the first scheduler module is further configured to obtain the configuration data and update the assignment data based on the configuration data to obtain updated assignment data, and wherein the first coordinator module is further configured to read the updated assignment data, generate a third collector module based on updated assignment data, and update the status data.

Clause 18: The host computing device of any one of Clauses 1 through 17, wherein the first scheduler module is further configured to obtain the configuration data and update the assignment data based on the configuration data to obtain updated assignment data, wherein the first coordinator module is further configured to read the updated assignment data, generate a third collector module on the first isolated execution environment based on the updated assignment data, and update the status data, and wherein a second coordinator module of the plurality of coordinator modules is configured to read the updated assignment data, generate a fourth collector module on a second isolated execution environment based on the updated assignment data, and update the status data, wherein the second coordinator module is configured to monitor execution of a second plurality of collector modules within the second isolated execution environment.

Clause 19: A method, comprising:

determining, by a first application interface of a first isolated execution environment of a plurality of isolated execution environments, configurations for a plurality of connectors, each connector of the plurality of connectors comprising a cluster of collector modules configured to collect data from a same data source, wherein the plurality of isolated execution environments are configured as data collection nodes;

assigning, by a first scheduler module of the first isolated execution environment, a cluster of collector modules of a first connector of the plurality of connectors between the plurality of isolated execution environments, wherein a communication buffer is communicatively coupled with the plurality of isolated execution environments and comprises configuration data indicating the configurations for the plurality of connectors, assignment data indicating assignment of the cluster of collector modules of the first connector between the plurality of isolated execution environments, and status data indicating a status of collector modules of the plurality of connectors, wherein the configuration data is editable by a plurality of application interfaces of the plurality of isolated execution environments, the assignment data is editable by the first scheduler module, and the status data is editable by a plurality of coordinator modules of the plurality of isolated execution environments;

collecting, by a first collector module of a first plurality of collector modules of the first isolated execution environment, data from a first data source of a first tenant;

collecting, by a second collector module of the first plurality of collector modules, data from a first data source of a second tenant; and monitoring, by a first coordinator module of the first isolated execution environment, execution of the first plurality of collector modules within the first isolated execution environment.

Clause 20: Non-transitory computer-readable media including computer-executable instructions that, when executed by a host computing device, cause the host computing device to:

determine, by a first application interface of a first isolated execution environment of a plurality of isolated execution environments, configurations for a plurality of connectors, each connector of the plurality of connectors comprising a cluster of collector modules configured to collect data from a same data source, wherein the plurality of isolated execution environments are configured as data collection nodes;

assign, by a first scheduler module of the first isolated execution environment, a cluster of collector modules of a first connector of the plurality of connectors between the plurality of isolated execution environments, wherein a communication buffer is communicatively coupled with the plurality of isolated execution environments and comprises configuration data indicating the configurations for the plurality of connectors, assignment data indicating assignment of the cluster of collector modules of the first connector between the plurality of isolated execution environments, and status data indicating a status of collector modules of the plurality of connectors, wherein the configuration data is editable by a plurality of application interfaces of the plurality of isolated execution environments, the assignment data is editable by the first scheduler module, and the status data is editable by a plurality of coordinator modules of the plurality of isolated execution environments;

collect, by a first collector module of a first plurality of collector modules of the first isolated execution environment, data from a first data source of a first tenant;

collect, by a second collector module of the first plurality of collector modules, data from a first data source of a second tenant; and monitor, by a first coordinator module of the first isolated execution environment, execution of the first plurality of collector modules within the first isolated execution environment.

Clause 21: A method, comprising:

retrieving, using a first isolated execution environment of a plurality of isolated execution environments instantiated on a host computing device, configuration data for a plurality of connectors from a communication buffer, wherein the communication buffer is instantiated on the host computing device and is communicatively coupled with the plurality of isolated execution environments, wherein the plurality of connectors are assigned to retrieve data from a plurality of data sources, and wherein each connector of the plurality of connectors comprises a plurality of distributable collector modules;

determining a range of collector modules and a range of connector-specific collector modules to assign to each of the plurality of isolated execution environments based on the configuration data to obtain a determined range of collector modules and a determined range of connector-specific collector modules; and assigning a group of distributable collector modules to each of the plurality of isolated execution environments based on the determined range of collector modules and the determined range of connector-specific collector modules, wherein a first distributable collector module of a first connector of the plurality of connectors is assigned to the first isolated execution environment and a first distributable collector module of a second connector of the plurality of connectors is assigned to the first isolated execution environment.

Clause 22: The method of Clause 21, wherein a second distributable collector module of the first connector is assigned to the first isolated execution environment.

Clause 23: The method of any one of Clause 21 or 22, wherein retrieving the configuration data comprises:

retrieving the configuration data using a scheduler module of the first isolated execution environment.

Clause 24: The method of any one of Clauses 21 through 23, further comprising:

assigning a scheduler module from a plurality of scheduler modules of the plurality of isolated execution environments to retrieve the configuration data.

Clause 25: The method of any one of Clauses 21 through 24, further comprising:

assigning a scheduler module of the first isolated execution environment from a plurality of scheduler modules of the plurality of isolated execution environments to retrieve the configuration data, wherein retrieving the configuration data comprises:

retrieving the configuration data using the scheduler module.

Clause 26: The method of any one of Clauses 21 through 25, further comprising:

assigning a scheduler module of the first isolated execution environment from a plurality of scheduler modules of the plurality of isolated execution environments to retrieve the configuration data, wherein retrieving the configuration data comprises:

retrieving the configuration data using the scheduler module, wherein connector-isolated execution environment assignments are editable by the scheduler module.

Clause 27: The method of any one of Clauses 21 through 26, wherein retrieving the configuration data comprises:

retrieving the configuration data using an active scheduler module of the first isolated execution environment, wherein the plurality of isolated execution environments comprises the active scheduler module and a plurality of standby scheduler modules.

Clause 28: The method of any one of Clauses 21 through 27, wherein assigning the group of distributable collector modules to each of the plurality of isolated execution environments is further based on a utilization associated with the plurality of isolated execution environments.

Clause 29: The method of any one of Clauses 21 through 28, further comprising:

modifying connector-isolated execution environment assignments based on assigning the group of distributable collector modules to each of the plurality of isolated execution environments.

Clause 30: The method of any one of Clauses 21 through 29, further comprising:

generating connector-isolated execution environment assignments to obtain generated connector-isolated execution environment assignments based on assigning the group of distributable collector modules to each of the plurality of isolated execution environments; and storing the generated connector-isolated execution environment assignments in the communication buffer.

Clause 31: The method of any one of Clauses 21 through 30, further comprising:

updating connector-isolated execution environment assignments stored in the communication buffer based on assigning the group of distributable collector modules to each of the plurality of isolated execution environments, wherein each of the plurality of isolated execution environments is configured to retrieve at least a portion of the connector-isolated execution environment assignments from the communication buffer.

Clause 32: The method of any one of Clauses 21 through 31, wherein the configuration data, connector-isolated execution environment assignments, and a status of collector modules are stored in the communication buffer.

Clause 33: The method of any one of Clauses 21 through 32, wherein a status of collector modules stored in the communication buffer is editable by a plurality of coordinator modules of the plurality of isolated execution environments.

Clause 34: The method of any one of Clauses 21 through 33, wherein each of the plurality of isolated execution environments is configured to update a status of collector modules stored in the communication buffer based on generation or termination of a collector module by a respective isolated execution environment.

Clause 35: The method of any one of Clauses 21 through 34, wherein each of the plurality of isolated execution environments is configured to generate one or more distributable collector modules.

Clause 36: The method of any one of Clauses 21 through 35, wherein a plurality of collector modules of a first connector of the plurality of connectors are configured to obtain data from a same data source.

Clause 37: The method of any one of Clauses 21 through 36, wherein the plurality of isolated execution environments share compute resources of the host computing device.

Clause 38: The method of any one of Clauses 21 through 37, wherein the range of collector modules indicates a range of collector modules for the first isolated execution environment, and wherein the range of connector-specific collector modules indicates a range of collector modules for the first connector and the first isolated execution environment and a range of collector modules for the second connector and the first isolated execution environment.

Clause 39: A host computing device comprising:

a data store; and one or more processors configured to:

retrieve, using a first isolated execution environment of a plurality of isolated execution environments instantiated on the host computing device, configuration data for a plurality of connectors from a communication buffer, wherein the communication buffer is instantiated on the host computing device and is communicatively coupled with the plurality of isolated execution environments, wherein the plurality of connectors are assigned to retrieve data from a plurality of data sources, and wherein each connector of the plurality of connectors comprises a plurality of distributable collector modules;

determine a range of collector modules and a range of connector-specific collector modules to assign to each of the plurality of isolated execution environments based on the configuration data to obtain a determined range of collector modules and a determined range of connector-specific collector modules; and assign a group of distributable collector modules to each of the plurality of isolated execution environments based on the determined range of collector modules and the determined range of connector-specific collector modules, wherein a first distributable collector module of a first connector of the plurality of connectors is assigned to the first isolated execution environment and a first distributable collector module of a second connector of the plurality of connectors is assigned to the first isolated execution environment.

Clause 40: Non-transitory computer-readable media including computer-executable instructions that, when executed by a host computing device, cause the host computing device to:

retrieve, using a first isolated execution environment of a plurality of isolated execution environments instantiated on the host computing device, configuration data for a plurality of connectors from a communication buffer, wherein the communication buffer is instantiated on the host computing device and is communicatively coupled with the plurality of isolated execution environments, wherein the plurality of connectors are assigned to retrieve data from a plurality of data sources, and wherein each connector of the plurality of connectors comprises a plurality of distributable collector modules;

determine a range of collector modules and a range of connector-specific collector modules to assign to each of the plurality of isolated execution environments based on the configuration data to obtain a determined range of collector modules and a determined range of connector-specific collector modules; and assign a group of distributable collector modules to each of the plurality of isolated execution environments based on the determined range of collector modules and the determined range of connector-specific collector modules, wherein a first distributable collector module of a first connector of the plurality of connectors is assigned to the first isolated execution environment and a first distributable collector module of a second connector of the plurality of connectors is assigned to the first isolated execution environment.

Clause 41: A method, comprising:

receiving an instruction to collect data from a first data source;

determining a type of the first data source is a first type;

based on a determination that the type of the first data source is the first type:

assigning a plurality of isolated execution environments to generate a first cluster of collector modules to collect data from the first data source, wherein each of the plurality of isolated execution environments generates at least one collector module of the first cluster of collector modules and configures the at least one collector module to collect data from the first data source, and assigning a first collector module of the first cluster of collector modules as a cluster leader, wherein the cluster leader is configured to:

obtain a data identifier of a plurality of blocks of data to be collected by the first cluster of collector modules, and communicate the data identifier of the plurality of blocks of data to a communication buffer, wherein the first cluster of collector modules are configured to retrieve the data identifier of the plurality of blocks of data from the communication buffer; and retrieving, using the first cluster of collector modules, the plurality of blocks of data from the first data source.

Clause 42: The method of Clause 41, further comprising:

retrieving configuration data from the communication buffer based on the instruction, wherein assigning the plurality of isolated execution environments is based on the configuration data.

Clause 43: The method of any one of Clause 41 or 42, further comprising:

retrieving configuration data from the communication buffer based on the instruction, wherein assigning the plurality of isolated execution environments is based on the configuration data, wherein the configuration data indicates the type of the first data source.

Clause 44: The method of any one of Clauses 41 through 43, further comprising:

retrieving configuration data from the communication buffer based on the instruction, wherein assigning the plurality of isolated execution environments is based on the configuration data, wherein the configuration data indicates an identifier of a connector corresponding to the first cluster of collector modules.

Clause 45: The method of any one of Clauses 41 through 44, further comprising:

retrieving configuration data from the communication buffer based on the instruction, wherein assigning the plurality of isolated execution environments is based on the configuration data, wherein the configuration data indicates a number of collector modules to be instantiated for the first cluster of collector modules.

Clause 46: The method of any one of Clauses 41 through 45, further comprising:

retrieving configuration data from the communication buffer based on the instruction, wherein assigning the plurality of isolated execution environments is based on the configuration data, wherein determining the type of the first data source is the first type is based on the configuration data.

Clause 47: The method of any one of Clauses 41 through 46, wherein assigning the plurality of isolated execution environments to generate the first cluster of collector modules comprises:

assigning at least one of the plurality of isolated execution environments to generate at least two collector modules of the first cluster of collector modules.

Clause 48: The method of any one of Clauses 41 through 47, wherein each of the plurality of isolated execution environments executes a respective plurality of collector modules corresponding to a respective plurality of connectors.

Clause 49: The method of any one of Clauses 41 through 48, wherein the plurality of isolated execution environments are instantiated on and share compute resources of a host computing device.

Clause 50: The method of any one of Clauses 41 through 49, wherein a first isolated execution environment of the plurality of isolated execution environments generates at least one collector module of the first cluster of collector modules, configures the at least one collector module of the first cluster of collector modules to collect data from the first data source, generates at least one collector module of a second cluster of collector modules, and configures the at least one collector module of the second cluster of collector modules to collect data from a second data source.

Clause 51: The method of any one of Clauses 41 through 50, wherein a second type of data source is configured to support parallel reads.

Clause 52: The method of any one of Clauses 41 through 51, wherein determining the type of the first data source is a first type is based on a determination that the first data source is not configured for parallel reads.

Clause 53: The method of any one of Clauses 41 through 52, further comprising:
retrieving the data identifier of the plurality of blocks of data from the communication buffer to obtain a retrieved data identifier of the plurality of blocks of data, wherein retrieving the plurality of blocks of data from the first data source is based on the retrieved data identifier of the plurality of blocks of data.

Clause 54: The method of any one of Clauses 41 through 53, wherein retrieving the plurality of blocks of data from the first data source comprises:
retrieving a data identifier of a block of data from the communication buffer; and
requesting, using the data identifier of the block of data, the block of data from the first data source.

Clause 55: The method of any one of Clauses 41 through 54, wherein retrieving the plurality of blocks of data from the first data source comprises:
retrieving a data identifier of a block of data from the communication buffer; and
requesting, using the data identifier of the block of data, the block of data from the first data source,
the method further comprising:
processing the block of data.

Clause 56: The method of any one of Clauses 41 through 55, wherein retrieving the plurality of blocks of data from the first data source comprises:
retrieving a data identifier of a block of data from the communication buffer; and
requesting, using the data identifier of the block of data, the block of data from the first data source,
the method further comprising:
processing the block of data; and
providing an update to the communication buffer indicating processing of the block of data.

Clause 57: The method of any one of Clauses 41 through 56, further comprising:
receiving an instruction to collect data from a second data source;
determining a type of the second data source is a second type; and
based on determining the type of the second data source is the second type, retrieving, using a second cluster of collector modules, a plurality of blocks of data from the second data source.

Clause 58: The method of any one of Clauses 41 through 57, further comprising:
receiving an instruction to collect data from a second data source;
determining a type of the second data source is a second type; and
based on a determination that the type of the second data source is the second type, retrieving, using a second cluster of collector modules, a plurality of blocks of data from a second data source, wherein the second data source provides coordination of the second cluster of collector modules.

Clause 59: A host computing device comprising:
a data store; and
one or more processors configured to:
receive an instruction to collect data from a first data source;
determine a type of the first data source is a first type;
based on a determination that the type of the first data source is the first type:
assign a plurality of isolated execution environments to generate a first cluster of collector modules to collect data from the first data source, wherein each of the plurality of isolated execution environments generates at least one collector module of the first cluster of collector modules and configures the at least one collector module to collect data from the first data source, and
assign a first collector module of the first cluster of collector modules as a cluster leader, wherein the cluster leader is configured to:
obtain a data identifier of a plurality of blocks of data to be collected by the first cluster of collector modules, and
communicate the data identifier of the plurality of blocks of data to a communication buffer, wherein the first cluster of collector modules are configured to retrieve the data identifier of the plurality of blocks of data from the communication buffer; and
retrieve, using the first cluster of collector modules, the plurality of blocks of data from the first data source.

Clause 60: Non-transitory computer-readable media including computer-executable instructions that, when executed by a host computing device, cause the host computing device to:
receive an instruction to collect data from a first data source;
determine a type of the first data source is a first type;
based on a determination that the type of the first data source is the first type:
assign a plurality of isolated execution environments to generate a first cluster of collector modules to collect data from the first data source, wherein each of the plurality of isolated execution environments generates at least one collector module of the first cluster of collector modules and configures the at least one collector module to collect data from the first data source, and assign a first collector module of the first cluster of
collector modules as a cluster leader, wherein the
cluster leader is configured to:
  obtain a data identifier of a plurality of blocks of data
    to be collected by the first cluster of collector
    modules, and
  communicate the data identifier of the plurality of
    blocks of data to a communication buffer, wherein
    the first cluster of collector modules are config-
    ured to retrieve the data identifier of the plurality
    of blocks of data from the communication buffer;
    and
retrieve, using the first cluster of collector modules, the
  plurality of blocks of data from the first data source.
Clause 61: A method, comprising:
receiving a first instruction to modify a collector module
  of a first cluster of collector modules configured to
  collect data from a first data source, wherein the first
  cluster of collector modules are instantiated on a plu-
  rality of isolated execution environments;
determining, using a scheduler process of a first isolated
  execution environment of the plurality of isolated
  execution environments, to modify a first collector
  module of the first cluster of collector modules;
identifying a second isolated execution environment of
  the plurality of isolated execution environments on
  which the first collector module is executing;
communicating to a communication buffer, using the
  scheduler process of the first isolated execution envi-
  ronment, a second instruction for the second isolated
  execution environment to terminate the first collector
  module and for a third isolated execution environment
  to generate the first collector module;
retrieving from the communication buffer, using a coor-
  dinating process of the second isolated execution envi-
  ronment, at least a first portion of the second instruc-
  tion;
terminating, using the coordinating process of the second
  isolated execution environment, the first collector mod-
  ule;
updating the communication buffer, using the coordinat-
  ing process of the second isolated execution environ-
  ment, to indicate that the first collector module is
  terminated;
retrieving from the communication buffer, using a coor-
  dinating process of the third isolated execution envi-
  ronment, at least a second portion of the second instruc-
  tion and an indication that the first collector module is
  terminated; and
generating, using the coordinating process of the third
  isolated execution environment, the first collector mod-
  ule on the third isolated execution environment.
Clause 62: The method of Clause 61, wherein generating
the first collector module is based on the at least a second
portion of the second instruction and the indication that the
first collector module is terminated.
Clause 63: The method of any one of Clause 61 or 62,
wherein the second isolated execution environment com-
prises a plurality of collector modules, wherein the plurality
of collector modules comprises a second collector module of
the first cluster of collector modules and a third collector
module of a second cluster of collector modules.
Clause 64: The method of any one of Clauses 61 through
63, wherein the second isolated execution environment
comprises a plurality of collector modules, wherein the
plurality of collector modules comprises a second collector
module of the first cluster of collector modules and a third collector module of a second cluster of collector modules,
wherein the second cluster of collector modules are config-
ured to collect data from a second data source.
Clause 65: The method of any one of Clauses 61 through
64, wherein the third isolated execution environment com-
prises a plurality of collector modules, wherein the plurality
of collector modules comprises a second collector module of
the first cluster of collector modules and a third collector
module of a second cluster of collector modules, wherein the
second cluster of collector modules are configured to collect
data from a second data source.
Clause 66: The method of any one of Clauses 61 through
65, wherein the first isolated execution environment com-
prises the second isolated execution environment.
Clause 67: The method of any one of Clauses 61 through
66, further comprising:
retrieving configuration data from the communication
  buffer based on the first instruction, wherein determin-
  ing to modify the first collector module is based on the
  configuration data.
Clause 68: The method of any one of Clauses 61 through
67, further comprising:
retrieving configuration data from the communication
  buffer based on the first instruction, wherein determin-
  ing to modify the first collector module is based on the
  configuration data, wherein the configuration data indi-
  cates at least one of an identifier of a connector corre-
  sponding to the first cluster of collector modules, a
  number of collector modules to be instantiated for the
  first cluster of collector modules, or a status of the
  connector.
Clause 69: The method of any one of Clauses 61 through
68, further comprising:
retrieving connector-isolated execution environment
  assignments and a status of collector modules, wherein
  determining to modify the first collector module is
  based on the connector-isolated execution environment
  assignments and the status of collector modules.
Clause 70: The method of any one of Clauses 61 through
69, further comprising:
retrieving connector-isolated execution environment
  assignments and a status of collector modules, wherein
  determining to modify the first collector module is
  based on the connector-isolated execution environment
  assignments and the status of collector modules,
  wherein the status of collector modules is editable by a
  plurality of coordinating processes of the plurality of
  isolated execution environments, and wherein the con-
  nector-isolated execution environment assignments are
  editable by the scheduler process of the first isolated
  execution environment.
Clause 71: The method of any one of Clauses 61 through
70, further comprising:
retrieving connector-isolated execution environment
  assignments and a status of collector modules; and
determining a range of collector modules and a range of
  connector-specific collector modules based on the con-
  nector-isolated execution environment assignments and
  the status of collector modules to obtain a determined
  range of collector modules and a determined range of
  connector-specific collector modules, wherein deter-
  mining to modify the first collector module is based on
  the determined range of collector modules and the
  determined range of connector-specific collector mod-
  ules.

Clause 72: The method of any one of Clauses 61 through 71, further comprising:

retrieving connector-isolated execution environment assignments and a status of collector modules;

determining a range of collector modules and a range of connector-specific collector modules based on the connector-isolated execution environment assignments and the status of collector modules to obtain a determined range of collector modules and a determined range of connector-specific collector modules; and determining updated connector-isolated execution environment assignments based on the determined range of collector modules and the determined range of connector-specific collector modules, wherein determining to modify the first collector module is based on the updated connector-isolated execution environment assignments.

Clause 73: The method of any one of Clauses 61 through 72, further comprising:

retrieving connector-isolated execution environment assignments and a status of collector modules;

determining a range of collector modules and a range of connector-specific collector modules based on the connector-isolated execution environment assignments and the status of collector modules to obtain a determined range of collector modules and a determined range of connector-specific collector modules;

determining updated connector-isolated execution environment assignments based on the determined range of collector modules and the determined range of connector-specific collector modules; and identifying the first collector module based on the updated connector-isolated execution environment assignments.

Clause 74: The method of any one of Clauses 61 through 73, wherein updating the communication buffer comprises:

updating the communication buffer to unlock control of the first collector module.

Clause 75: The method of any one of Clauses 61 through 74, wherein updating the communication buffer comprises:

updating the communication buffer to unlock control of the first collector module, the method further comprising:

updating the communication buffer to lock control of the first collector module based on generating the first collector module on the third isolated execution environment.

Clause 76: The method of any one of Clauses 61 through 75, further comprising:

updating the communication buffer to indicate that the first collector module is generated on the third isolated execution environment.

Clause 77: The method of any one of Clauses 61 through 76, wherein the plurality of isolated execution environments are instantiated on and share compute resources of a host computing device.

Clause 78: The method of any one of Clauses 61 through 77, wherein the communication buffer is communicatively coupled with the plurality of isolated execution environments.

Clause 79: A host computing device comprising:

a data store; and one or more processors configured to:

receive a first instruction to modify a collector module of a first cluster of collector modules configured to collect data from a first data source, wherein the first cluster of collector modules are instantiated on a plurality of isolated execution environments;

determine, using a scheduler process of a first isolated execution environment of the plurality of isolated execution environments, to modify a first collector module of the first cluster of collector modules;

identify a second isolated execution environment of the plurality of isolated execution environments on which the first collector module is executing;

communicate to a communication buffer, using the scheduler process of the first isolated execution environment, a second instruction for the second isolated execution environment to terminate the first collector module and for a third isolated execution environment to generate the first collector module;

retrieve from the communication buffer, using a coordinating process of the second isolated execution environment, at least a first portion of the second instruction;

terminate, using the coordinating process of the second isolated execution environment, the first collector module;

update the communication buffer, using the coordinating process of the second isolated execution environment, to indicate that the first collector module is terminated;

retrieve from the communication buffer, using a coordinating process of the third isolated execution environment, at least a second portion of the second instruction and an indication that the first collector module is terminated; and generate, using the coordinating process of the third isolated execution environment, the first collector module on the third isolated execution environment.

Clause 80: Non-transitory computer-readable media including computer-executable instructions that, when executed by a host computing device, cause the host computing device to:

receive a first instruction to modify a collector module of a first cluster of collector modules configured to collect data from a first data source, wherein the first cluster of collector modules are instantiated on a plurality of isolated execution environments;

determine, using a scheduler process of a first isolated execution environment of the plurality of isolated execution environments, to modify a first collector module of the first cluster of collector modules;

identify a second isolated execution environment of the plurality of isolated execution environments on which the first collector module is executing;

communicate to a communication buffer, using the scheduler process of the first isolated execution environment, a second instruction for the second isolated execution environment to terminate the first collector module and for a third isolated execution environment to generate the first collector module;

retrieve from the communication buffer, using a coordinating process of the second isolated execution environment, at least a first portion of the second instruction;

terminate, using the coordinating process of the second isolated execution environment, the first collector module;

update the communication buffer, using the coordinating process of the second isolated execution environment, to indicate that the first collector module is terminated;

retrieve from the communication buffer, using a coordinating process of the third isolated execution environment, at least a second portion of the second instruction and an indication that the first collector module is terminated; and generate, using the coordinating process of the third isolated execution environment, the first collector module on the third isolated execution environment.

5.0. Terminology

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described herein can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described herein. Rather, the specific features and acts described herein are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively.

The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described herein with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described herein to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A host computing device, comprising:

a plurality of isolated execution environments configured as data collection nodes, wherein a first isolated execution environment of the plurality of isolated execution environments comprises:

a first application interface configured to determine configurations for a plurality of connectors, each connector of the plurality of connectors comprising a respective cluster of collector modules configured to collect data from a same data source, a first plurality of collector modules, wherein a first collector module of the first plurality of collector modules is configured to collect data from a first data source of a first tenant and a second collector module of the first plurality of collector modules is configured to collect data from a first data source of a second tenant, wherein the first collector module corresponds to a first connector of the plurality of connectors and the second collector module corresponds to a second connector of the plurality of connectors, a first coordinator module configured to monitor execution of the first plurality of collector modules within the first isolated execution environment, and a first scheduler module configured to assign a first cluster of collector modules of the first connector between the plurality of isolated execution environments; and a communication buffer communicatively coupled with the plurality of isolated execution environments, the communication buffer comprising:

configuration data indicating the configurations for the plurality of connectors, wherein the configuration data is editable by a plurality of application interfaces of the plurality of isolated execution environments, assignment data indicating assignment of the first cluster of collector modules of the first connector between the plurality of isolated execution environments, wherein the assignment data is editable by the first scheduler module, and status data indicating a status of collector modules of the plurality of connectors, wherein the status data is editable by a plurality of coordinator modules of the plurality of isolated execution environments.

2. A method, comprising:

determining, by a first application interface of a first isolated execution environment of a plurality of isolated execution environments, configurations for a plurality of connectors, each connector of the plurality of connectors comprising a respective cluster of collector modules configured to collect data from a same data source, wherein the plurality of isolated execution environments are configured as data collection nodes;

assigning, by a first scheduler module of the first isolated execution environment, a first cluster of collector modules of a first connector of the plurality of connectors between the plurality of isolated execution environments, wherein a communication buffer is communicatively coupled with the plurality of isolated execution environments and comprises configuration data indicating the configurations for the plurality of connectors, assignment data indicating assignment of the first cluster of collector modules of the first connector between the plurality of isolated execution environments, and status data indicating a status of collector modules of the plurality of connectors, wherein the configuration data is editable by a plurality of application interfaces of the plurality of isolated execution environments, the assignment data is editable by the first scheduler module, and the status data is editable by a plurality of coordinator modules of the plurality of isolated execution environments;

collecting, by a first collector module of a first plurality of collector modules of the first isolated execution environment, data from a first data source of a first tenant;

collecting, by a second collector module of the first plurality of collector modules, data from a first data source of a second tenant; and monitoring, by a first coordinator module of the first isolated execution environment, execution of the first plurality of collector modules within the first isolated execution environment.

3. The method of claim 2, wherein the plurality of isolated execution environments share compute resources of a host computing device.

4. The method of claim 2, wherein a third collector module of the first plurality of collector modules corresponds to the first connector and is configured to collect data from the first data source of the first tenant.

5. The method of claim 2, wherein a second isolated execution environment of the plurality of isolated execution environments comprises:

a second plurality of collector modules, wherein at least one collector module of the second plurality of collector modules corresponds to the first connector.

6. The method of claim 2, wherein a second isolated execution environment of the plurality of isolated execution environments comprises:

a second plurality of collector modules, wherein at least one collector module of the second plurality of collector modules corresponds to the first connector, and a second coordinator module of the plurality of coordinator modules, the second coordinator module configured to monitor execution of the second plurality of collector modules within the second isolated execution environment.

7. The method of claim 2, wherein a second isolated execution environment of the plurality of isolated execution environments comprises:

a second plurality of collector modules, wherein at least one collector module of the second plurality of collector modules corresponds to the first connector, a second coordinator module of the plurality of coordinator modules, the second coordinator module configured to monitor execution of the second plurality of collector modules within the second isolated execution environment, and a second scheduler module, wherein the second scheduler module is disabled.

8. The method of claim 2, wherein the first scheduler module is configured to read the status data from the communication buffer.

9. The method of claim 2, wherein the first scheduler module is configured to read the status data from the communication buffer and modify the assignment data based on the status data.

10. The method of claim 2, wherein the first scheduler module is configured to read the status data from the communication buffer and modify the assignment data based on the status data, wherein to modify the assignment data, the first scheduler module is configured to modify an assignment of a third collector module from the first isolated execution environment to an assignment of the third collector module to a second isolated execution environment of the plurality of isolated execution environments.

11. The method of claim 2, wherein the first scheduler module is configured to read the status data from the communication buffer and modify the assignment data based on the status data to obtain modified assignment data, wherein to modify the assignment data, the first scheduler module is configured to modify an assignment of a third collector module from the first isolated execution environment to a second isolated execution environment of the plurality of isolated execution environments to obtain a modified assignment of the third collector module, and wherein the first coordinator module is configured to read the modified assignment data and terminate the third collector module on the first isolated execution environment based on the modified assignment of the third collector module.

12. The method of claim 2, wherein the first scheduler module is configured to read the status data from the communication buffer and modify the assignment data based on the status data to obtain modified assignment data, wherein to modify the assignment data, the first scheduler module is configured to modify an assignment of a third collector module from the first isolated execution environment to a second isolated execution environment of the plurality of isolated execution environments to obtain a modified assignment of the third collector module, wherein the first coordinator module is configured to read the modified assignment data and terminate the third collector module on the first isolated execution environment based on the modified assignment of the third collector module, and wherein a second coordinator module of the plurality of coordinator modules is configured to read the modified assignment data and generate the third collector module on a second isolated execution environment based on the modified assignment of the third collector module, wherein the second coordinator module is configured to monitor execution of a second plurality of collector modules within the second isolated execution environment.

13. The method of claim 2, wherein the first scheduler module is configured to read the status data from the communication buffer and modify the assignment data based on the status data to obtain modified assignment data, wherein to modify the assignment data, the first scheduler module is configured to modify an assignment of a third collector module from the first isolated execution environment to a second isolated execution environment of the plurality of isolated execution environments to obtain a modified assignment of the third collector module, wherein the first coordinator module is configured to read the modified assignment data and terminate the third collector module on the first isolated execution environment based on the modified assignment of the third collector module, and wherein a second coordinator module of the plurality of coordinator modules is configured to read the modified assignment data and the status data, determine the status data indicates reassignment of the third collector module is available based on termination of the third collector module on the first isolated execution environment, and generate the third collector module on a second isolated execution environment based on the modified assignment of the third collector module, wherein the second coordinator module is configured to monitor execution of a second plurality of collector modules within the second isolated execution environment.

14. The method of claim 2, wherein the first application interface is further configured to update the configuration data.

15. The method of claim 2, wherein the first scheduler module is further configured to obtain the configuration data and determine a number of collector modules based on the configuration data.

16. The method of claim 2, wherein the first scheduler module is further configured to obtain the configuration data and determine a number of collector modules based on the configuration data, wherein the first scheduler module is configured to define the first cluster of collector modules based on the number of collector modules.

17. The method of claim 2, wherein the first scheduler module is further configured to obtain the configuration data and update the assignment data based on the configuration data.

18. The method of claim 2, wherein the first scheduler module is further configured to obtain the configuration data and update the assignment data based on the configuration data to obtain updated assignment data, and wherein the first coordinator module is further configured to read the updated assignment data, generate a third collector module based on updated assignment data, and update the status data.

19. The method of claim 2, wherein the first scheduler module is further configured to obtain the configuration data and update the assignment data based on the configuration data to obtain updated assignment data, wherein the first coordinator module is further configured to read the updated assignment data, generate a third collector module on the first isolated execution environment based on the updated assignment data, and update the status data, and wherein a second coordinator module of the plurality of coordinator modules is configured to read the updated assignment data, generate a fourth collector module on a second isolated execution environment based on the updated assignment data, and update the status data, wherein the second coordinator module is configured to monitor execution of a second plurality of collector modules within the second isolated execution environment.

20. Non-transitory computer-readable media including computer-executable instructions that, when executed by a host computing device, cause the host computing device to:

determine, by a first application interface of a first isolated execution environment of a plurality of isolated execution environments, configurations for a plurality of connectors, each connector of the plurality of connectors comprising a respective cluster of collector modules configured to collect data from a same data source, wherein the plurality of isolated execution environments are configured as data collection nodes;

assign, by a first scheduler module of the first isolated execution environment, a first cluster of collector modules of a first connector of the plurality of connectors between the plurality of isolated execution environments, wherein a communication buffer is communicatively coupled with the plurality of isolated execution environments and comprises configuration data indicating the configurations for the plurality of connectors, assignment data indicating assignment of the first cluster of collector modules of the first connector between the plurality of isolated execution environments, and status data indicating a status of collector modules of the plurality of connectors, wherein the configuration data is editable by a plurality of application interfaces of the plurality of isolated execution environments, the assignment data is editable by the first scheduler module, and the status data is editable by a plurality of coordinator modules of the plurality of isolated execution environments;

collect, by a first collector module of a first plurality of collector modules of the first isolated execution environment, data from a first data source of a first tenant;

collect, by a second collector module of the first plurality of collector modules, data from a first data source of a second tenant; and monitor, by a first coordinator module of the first isolated execution environment, execution of the first plurality of collector modules within the first isolated execution environment.

* * * * *